(12) United States Patent
Bang et al.

(10) Patent No.: US 11,540,254 B2
(45) Date of Patent: Dec. 27, 2022

(54) APPARATUS AND METHOD FOR ALLOCATING RESOURCES IN WIRELESS COMMUNICATION SYSTEM

(71) Applicant: Samsung Electronics Co., Ltd., Suwon-si (KR)

(72) Inventors: Jonghyun Bang, Suwon-si (KR); Hyunseok Ryu, Suwon-si (KR); Sungjin Park, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 16/535,745

(22) Filed: Aug. 8, 2019

(65) Prior Publication Data
US 2020/0053713 A1 Feb. 13, 2020

(30) Foreign Application Priority Data

Aug. 8, 2018 (KR) .................. 10-2018-0092427
Mar. 26, 2019 (KR) .................. 10-2019-0034368

(51) Int. Cl.
*H04W 72/04* (2009.01)
(52) U.S. Cl.
CPC ... *H04W 72/0406* (2013.01); *H04W 72/0446* (2013.01)
(58) Field of Classification Search
CPC .............. H04W 72/0406; H04W 72/0446
See application file for complete search history.

(56) References Cited

U.S. PATENT DOCUMENTS

2017/0041917 A1* 2/2017 Agiwal ................ H04W 8/005
2017/0290048 A1 10/2017 Amuru et al.
(Continued)

FOREIGN PATENT DOCUMENTS

KR  10-2018-0107965 A  10/2018
WO  2017/126935 A1  7/2017
(Continued)

OTHER PUBLICATIONS

Interdigital Inc., "BWP operation in unlicensed spectrum", R1-1806968, 3GPP RAN WG1 Meeting #93, Busan, Korea, May 11, 2018.
(Continued)

*Primary Examiner* — Michael Thier
*Assistant Examiner* — Nevena Zecevic Sandhu
(74) *Attorney, Agent, or Firm* — Jefferson IP Law, LLP

(57) ABSTRACT

An apparatus and a method for allocating resources in a wireless communication system is provided. More specifically, a method of determining an uplink transmission resource region for performing a channel access procedure of the BS through a channel access procedure type and subcarrier spacing and determining configuration of downlink resources of the BS through scheduling information and slot structure information is proposed. A method of operating a terminal in a wireless communication system includes acquiring a maximum channel occupancy time (MCOT) of the terminal within an unlicensed band, determining a time interval which a base station (BS) can use for downlink signal transmission in the maximum channel occupancy time, transmitting the maximum channel occupancy time and time information related to the time interval to the BS and receiving a downlink signal from the BS during the time interval in the maximum channel occupancy time.

14 Claims, 29 Drawing Sheets

(56) References Cited

U.S. PATENT DOCUMENTS

| | | | |
|---|---|---|---|
| 2018/0176067 A1* | 6/2018 | Luo | H04L 27/2678 |
| 2018/0192383 A1 | 7/2018 | Nam et al. | |
| 2019/0208540 A1* | 7/2019 | Kim | H04W 16/14 |
| 2019/0342915 A1 | 11/2019 | Kim et al. | |
| 2020/0015266 A1* | 1/2020 | Yan | H04W 74/0833 |
| 2020/0022219 A1* | 1/2020 | Jeon | H04W 72/042 |
| 2020/0029349 A1* | 1/2020 | Chang | H04W 72/0446 |
| 2020/0322990 A1* | 10/2020 | Liu | H04L 5/0094 |
| 2020/0389847 A1* | 12/2020 | Deng | H04B 7/0617 |
| 2020/0413453 A1* | 12/2020 | Shao | H04L 5/00 |
| 2021/0058929 A1* | 2/2021 | Ning | H04W 72/1268 |

FOREIGN PATENT DOCUMENTS

| | | |
|---|---|---|
| WO | 2018/027815 A1 | 2/2018 |
| WO | 2018/174639 A1 | 9/2018 |

OTHER PUBLICATIONS

International Search Report and Written Opinion dated Dec. 9, 2019, issued in International Patent Application No. PCT/KR2019/009936.

Huawei, HiSilicon, Remaining details for AUL HARQ operation, 3GPP TSG RAN WG1 meeting #92, R1-1801374, Athens, Greece Feb. 26-Mar. 2, 2018.

Huawei, HiSilicon, Remaining details on AUL channel access, 3GPP TSG RAN WG1 meeting #92, R1-1801375, Athens, Greece Feb. 26-Mar. 2, 2018.

Qualcomm Incorporated, TxOP Frame Structure for NR unlicensed, 3GPP TSG RAN WG1 meeting #93, R1-1807386 Busan Korea, May 20-25, 2018.

European Search Report dated Jul. 27, 2021, issued in European Application No. 19847059.3.

* cited by examiner

APPARATUS AND METHOD FOR ALLOCATING RESOURCES IN WIRELESS COMMUNICATION SYSTEM

CROSS-REFERENCE TO RELATED APPLICATION(S)

This application is based on and claims priority under 35 U.S.C. 119(a) of a Korean patent application number 10-2018-0092427, filed on Aug. 8, 2018, and of a Korean patent application number 10-2019-0034368, filed on Mar. 26, 2019, in the Korean Intellectual Property Office, the disclosure of each of which is herein incorporated by reference in their entireties.

BACKGROUND

1) Field

The disclosure relates to a wireless communication system. More particularly, the disclosure relates to an apparatus and a method for allocating resources in a wireless communication system.

2) Description of Related Art

To meet the demand for wireless data traffic having increased since deployment of 4G ($4^{th}$ generation) communication systems, efforts have been made to develop an improved 5G ($5^{th}$ generation) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G system may flexibly define and operate the frame structure in consideration of various services and requirements. Since the 5G system supports a plurality of subcarrier spacings according to the service requirements, a symbol length may vary depending on the subcarrier spacing. Accordingly, it is required to consider used subcarrier spacing to allocate resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for allocating resources in a wireless communication system.

Another aspect of the disclosure is to provide an apparatus and a method for transmitting additional information as well as scheduling information of a downlink reception resource region or an uplink transmission resource region when a downlink signal is received or an uplink signal is transmitted through an unlicensed band in a wireless communication system.

Additional aspects will be set forth in part in the description which follows and, in part, will be apparent from the description, or may be learned by practice of the presented embodiments.

In accordance with an aspect of the disclosure, a method of operating a terminal in a wireless communication system is provided. The method includes acquiring a maximum channel occupancy time (MCOT) of the terminal within an unlicensed band, determining a time interval which a base station (BS) can use for downlink signal transmission in the MCOT, transmitting the MCOT and time information related to the time interval to the BS and receiving a downlink signal from the BS during the time interval in the maximum channel occupancy time.

In accordance with another aspect of the disclosure, a method of operating a BS in a wireless communication system is provided. The method includes receiving an MCOT of a terminal within an unlicensed band and time information related to a time interval which the BS can use for downlink signal transmission in the MCOT from the terminal, and transmitting a downlink signal to the terminal during the time interval in the MCOT.

In accordance with another aspect of the disclosure, an apparatus of a terminal in a wireless communication system is provided. The apparatus includes a transceiver, and at least one processor functionally connected to the transceiver, wherein the at least one processor is configured to acquire an MCOT of the terminal within an unlicensed band, configure a time interval which a BS can use for downlink signal transmission in the maximum channel occupancy time, transmit the MCOT and time information related to the time interval to the BS, and receive a downlink signal from the BS during the time interval in the MCOT.

In accordance with another aspect of the disclosure, an apparatus of a base station (BS) in a wireless communication system is provided. The apparatus includes a transceiver and at least one processor functionally connected to the transceiver, wherein the at least one processor is configured to receive a maximum channel occupancy time (MCOT) of the terminal within an unlicensed band and time information related to a time interval which the BS can use for downlink signal transmission in the maximum channel occupancy time from a terminal and transmit a downlink signal to the terminal during the time interval in the maximum channel occupancy time.

According to various embodiments of the disclosure, it is possible to efficiently use resources in a wireless communication system. Particularly, a system and a node transmitting and receiving a signal through an unlicensed band may determine a downlink signal reception resource region or an uplink transmission resource region on the basis of slot structure information and other additional information received from a node accessing the unlicensed band through scheduling information and a channel access procedure, thereby more efficiently using the unlicensed band.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
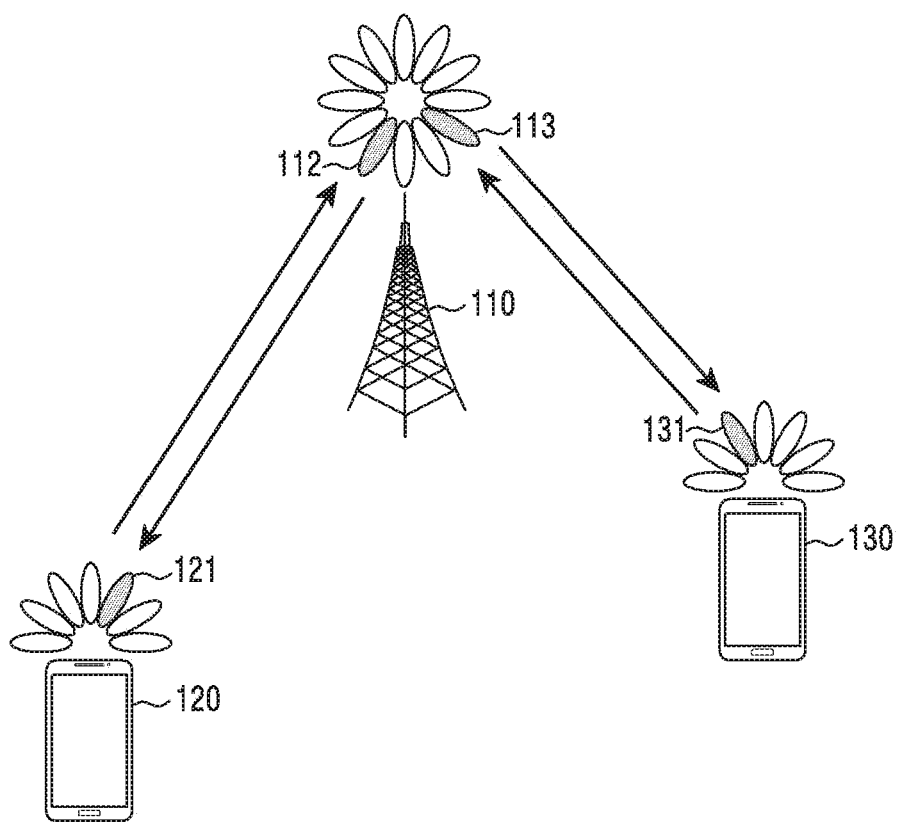
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms as described below are defined in consideration of the functions in the embodiments, and the meaning of the terms may vary according to the intention of a user or operator, convention, or the like. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the disclosure relates to an apparatus and a method for allocating resources in a wireless communication system. Specifically, the disclosure describes a technology for allocating resources in an unlicensed band in a wireless communication system.

As used in the following description, the terms referring to communication schemes, the terms referring to signals, the terms referring to information, the terms referring to network entities, the terms referring to device elements, and the like are employed by way of example for the convenience of description. Accordingly, the disclosure is not limited to the following terms and other terms having the same technical meaning may be used.

Further, although various embodiments of the disclosure will be described using terms that are used in some communication standards (e.g., 3rd Generation Partnership Project (3GPP)), they are provided only for the purpose of illustration. The various embodiments of the disclosure may also be easily applied to other communication systems by making modifications and change thereto.

Descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical functions. It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a Field Programmable Gate Array (FPGA) or an Application Specific Integrated Circuit (ASIC), which performs a predetermined function. However, the term "unit" does not always have a meaning limited to software or hardware. The "unit" may be constructed either to be stored in an addressable storage medium or to execute one or more processors. Therefore, the term "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the "unit" may be either combined into a smaller number of elements, or divided into a larger number of elements. Moreover, the elements and "units" may be implemented to reproduce one or more CPUs within a device or a security multimedia card. Further, in the embodiments, the "unit" may include at least one processor.

FIG. 1 illustrates a wireless communication system according to an embodiment of the disclosure.

Referring to FIG. 1, a Base Station (BS) 110, a terminal 120, and a terminal 130 are illustrated as some of the nodes using a radio channel in a wireless communication system. FIG. 1 illustrates only one BS but may further include another BS, which is the same as or similar to the BS 110.

The BS 110 is a network infrastructure element that provides wireless access to the terminals 120 and 130. The BS 110 has coverage defined for a predetermined geographical region based on the distance at which a signal can be transmitted. The BS 110 may be referred to as "Access Point (AP)", an "evolved NodeB (eNB)", a "5th-Generation (5G) node", a "wireless point", a "Transmission/Reception Point (TRP)", or another term having a meaning equivalent thereto, as well as "base station".

Each of the terminals 120 and 130 is a device used by a user, and performs communication with the BS 110 through a wireless channel Depending on the case, at least one of the terminals 120 and 130 may operate without user involvement. At least one of the terminals 120 and 130 may be a device that performs Machine-Type Communication (MTC), and may not be carried by the user. Each of the terminals 120 and 130 may be referred to as "User Equipment (UE)", "mobile station", "subscriber station", "remote terminal", "wireless terminal", "user device", or other terms having the equivalent technical meaning, as well as "terminal".

The BS 110, the terminal 120, and the terminal 130 may transmit and receive wireless signals in millimeter-wave (mmWave) bands (e.g., 28 GHz, 30 GHz, 38 GHz, and 60 GHz). In order to increase a channel gain, the BS 110, the terminal 120, and the terminal 130 may perform beamforming The beamforming may include transmission beamforming and reception beamforming That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or beam management procedure. After the serving beams 112, 113, 121, and 131 are selected, communication may be performed through resources having a Quasi-Co-Located (QCL) relationship with resources through which the serving beams 112, 113, 121, and 131 are transmitted.

If the large-scale characteristics of a channel for transmitting symbols on a first antenna port can be inferred from a channel for transmitting symbols on a second antenna port, the first antenna port and the second antenna port may be evaluated to have a QCL relationship therebetween. For example, the large-scale characteristics may include at least one of delay spread, Doppler spread, Doppler shift, average gain, average delay, and spatial receiver parameters.

The system illustrated in FIG. 1 may be a $5^{th}$ Generation (5G) system. The 5G system considers resources for more various services than the conventional $4^{th}$ Generation (4G) system. For example, most representative services may be an ultra wide band mobile communication service (enhanced Mobile Broad Band (eMBB)), an ultra-reliable and low latency communication service (Ultra-Reliable and Low Latency Communication (URLLC)), a massive device-to-device communication service (massive Machine Type Communication (mMTC)), and a next-generation broadcast service (evolved Multimedia Broadcast/Multicast Service (eMBMS)). A system providing the URLLC service may be referred to as a URLLC system, and a system providing the eMBB service may be referred to as an eMBB system. The terms "service" and "system" may be interchangeably used.

As described above, a plurality of services may be provided to a user in a communication system, and in order to provide the plurality of services to the user, a method of providing each service in the same time interval according to a characteristic thereof and an apparatus using the same are needed.

In a wireless communication system, for example, a Long Term Evolution (LTE) or LTE-Advanced (LTE-A) system or a 5G New Radio (NR) system, the BS may transmit Downlink Control Information (DCI) including resource allocation information, through which a downlink signal transmitted from the BS to the terminal is transmitted, to the terminal through a downlink control channel (Physical Downlink Control Channel (PDCCH)) and the terminal may receive at least one downlink signal among downlink control information (e.g., a Channel-State Information Reference Signal (CSI-RS), a broadcast channel (physical broadcast channel (PBCH), or a downlink data channel (Physical Downlink Shared Channel (PDSCH). For example, the BS transmits downlink control information (DCI) indicating reception of a PDSCH in subframe n through a PDCCH to the terminal, and the terminal receiving the downlink control information (DCI) receives the PDSCH in subframe n according to the received downlink control information.

In the LTE, LTE-A, or NR system, the BS may transmit downlink control information (DCI) including uplink resource allocation information to the terminal through the downlink control channel (PDCCH) and the terminal may transmit at least one uplink signal among uplink control information (e.g., a Sounding Reference Signal (SRS), Uplink Control Information (UCI), or Physical Random Access Channel (PRACH)) or uplink data channel (Physical Uplink Shared Channel (PUSCH)) to the BS. For example, the terminal receiving uplink transmission configuration information (or uplink DCI or UL grant) transmitted through the PDCCH from the BS in subframe n may perform uplink data channel transmission (hereinafter, referred to as PUSCH transmission) according to a time defined in advance (e.g., n+4), a time configured through a higher layer signal (e.g., n+k), or uplink signal transmission time indicator information (e.g., n+k) included in the uplink transmission configuration information.

When the configured downlink transmission is performed from the BS to the terminal through an unlicensed band or the configured uplink transmission is performed from the terminal to the BS through an unlicensed band, a transmission device (the BS or the terminal) may perform a channel access procedure for the unlicensed band in which the signal transmission is configured or perform Listen-Before Talk (LBT) before a time point at which the configured signal transmission is performed, and when it is determined that the unlicensed band is in an idle state on the basis of the result of the channel access procedure, may access the unlicensed band and perform the configured signal transmission. When it is determined that the unlicensed band is not in the idle state or is in an occupied state according to the channel access procedure performed by the transmission device, the transmission device cannot access the unlicensed band and thus cannot perform the configured signal transmission. In the channel access procedure in the unlicensed band in which the signal transmission is configured, the transmission device receives a signal in the unlicensed band during a predetermined time or a time calculated according to a predefined rule (e.g., a time calculated through one random value selected by at least the BS or the terminal) and compares the intensity of the received signal with a predefined threshold value or a threshold value calculated by a function including at least one parameter among a channel bandwidth, a signal bandwidth in which the signal to be transmitted is transmitted, an intensity of transmission power, and a beam width of the transmitted signal, so as to determine whether the unlicensed band is in the idle state. For example, when the intensity of the signal received by the transmission device during 25 us is smaller than a predefined threshold value of −72 dBm, it may be determined that the unlicensed band is in the idle state and the configured signal transmission may be performed.

A maximum time during which the signal is transmitted may be limited according to a Maximum Channel Occupancy Time (MCOT) defined for each country or each region in the unlicensed band or the type of the transmission device (e.g., the BS, the terminal, a master device, or a slave device). For example, in the case of Japan, after performing a channel access procedure in an unlicensed band of 5 GHz, the BS or the terminal may occupy a channel during a maximum of 4 ms without additional channel access procedure and transmit a signal. When the intensity of the signal received during 25 us is larger than a predefined threshold value of −72 dBm, the BS determines that the unlicensed band is not in the idle state and does not transmit a signal.

In the 5G communication system, in order to provide various services and support a high data transmission rate, various technologies for performing retransmission in units of code block groups and transmitting an uplink signal without uplink scheduling information. Accordingly, when 5G communication is performed through the unlicensed band, a more efficient channel access procedure considering various parameters is needed.

A wireless communication system has developed to be a broadband wireless communication system that provides a high speed and high quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. Also, communication standard of 5G or New Radio (NR) is being developed as a 5G wireless communication system.

As described above, the wireless communication system including $5^{th}$ generation may provide at least one service of enhanced Mobile Broadband (eMBB), massive Machine Type Communications (mMTC), and Ultra-Reliable and Low-Latency Communications (URLLC) to the terminal Services may be provided to the same terminal within the same time interval. The eMBB may be a service aiming at high-speed transmission of high-capacity data, the mMTC may be a service aiming at minimization of terminal power and access of a plurality of terminals, and the URLLC may be a service aiming at high reliability and low latency, but are not limited thereto. The three services may be main scenarios in the LTE system or the 5G/NR system after LTE.

When the BS schedules data corresponding to the eMBB service in any terminal in a specific transmission time interval (TTI) and URLLC data should be transmitted in the TTI, the BS does not transmit some of the eMBB data in the frequency band in which the eMBB data has been already scheduled and is being transmitted and transmits the generated URLLC data in the frequency band. The terminal in which eMBB is scheduled and the terminal in which URLLC is scheduled may be the same terminal or different terminals. In this case, some of the eMBB data which has been already scheduled and is being transmitted are not transmitted, and thus possibility of damage of the eMBB data increases. Accordingly, in this case, it is required to determine a method of processing a signal received by the terminal in which the eMBB data is scheduled or the terminal in which URLLC data is scheduled and a method of receiving the signal.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms as described below are defined in consideration of the functions in the embodiments, and the meaning of the terms may vary according to the intention of a user or operator, convention, or the like. Therefore, the definitions of the terms should be made based on the contents throughout the specification. Hereinafter, the BS is the entity that allocates resources to the terminal and may be one of an eNode B, a Node B, a Base Station (BS), a radio access unit, an eNB controller, and a node on a network. The terminal may include a User Equipment (UE), a Mobile Station (MS), a cellular phone, a smart phone, a computer, and a multimedia system capable of performing a communication function.

In the disclosure, a downlink (DL) refers to a wireless transmission path of a signal that the BS transmits to the terminal, and an uplink (UL) refers to a wireless transmission path of a signal that the terminal transmits to the BS. Hereinafter, an embodiment of the disclosure describes the LTE or LTE-A system by way of example, but the embodiment of the disclosure can be applied to other communication systems having a similar technical background or channel form. For example, other communication systems may include a $5^{th}$ generation mobile communication technology (5G, new radio, or NR) developed after LTE-A. The embodiments of the disclosure can be applied to other communication systems through some modifications without departing from the scope of the disclosure on the basis of determination by those skilled in the art.

The NR system, which is a representative example of the broadband wireless communication system, employs an Orthogonal Frequency Division Multiplexing (OFDM) scheme for a downlink (DL), and employs both the OFDM scheme and a Single Carrier Frequency Division Multiple Access (SC-FDMA) scheme for an uplink (UL). The uplink is a radio link through which the terminal (or User Equipment (UE)) or a Mobile Station (MS) transmits data or a control signal to a BS (or an eNode B), and the downlink is a radio link through which the BS transmits data or a control signal to the terminal. In the multi-access scheme described above, time-frequency resources for carrying data or control information are allocated and operated in a manner to prevent overlapping of the resources, i.e. to establish orthogonality between users so as to identify data or control information of each user.

When decoding fails at the initial transmission, the NR system employs Hybrid Automatic Repeat reQuest (HARQ) that retransmits the corresponding data on a physical layer. In the HARQ scheme, when a receiver does not accurately decode data, the receiver transmits information (negative acknowledgement: NACK) informing a transmitter of a decoding failure and thus the transmitter may re-transmit the corresponding data on the physical layer. The receiver increases data reception performance by combining the data re-transmitted by the transmitter with the data of which decoding failed. Also, when the receiver accurately decodes data, the receiver transmits information (acknowledgement (ACK)) indicating success in decoding to the transmitter, so that the transmitter may transmit new data.

Figure 2:
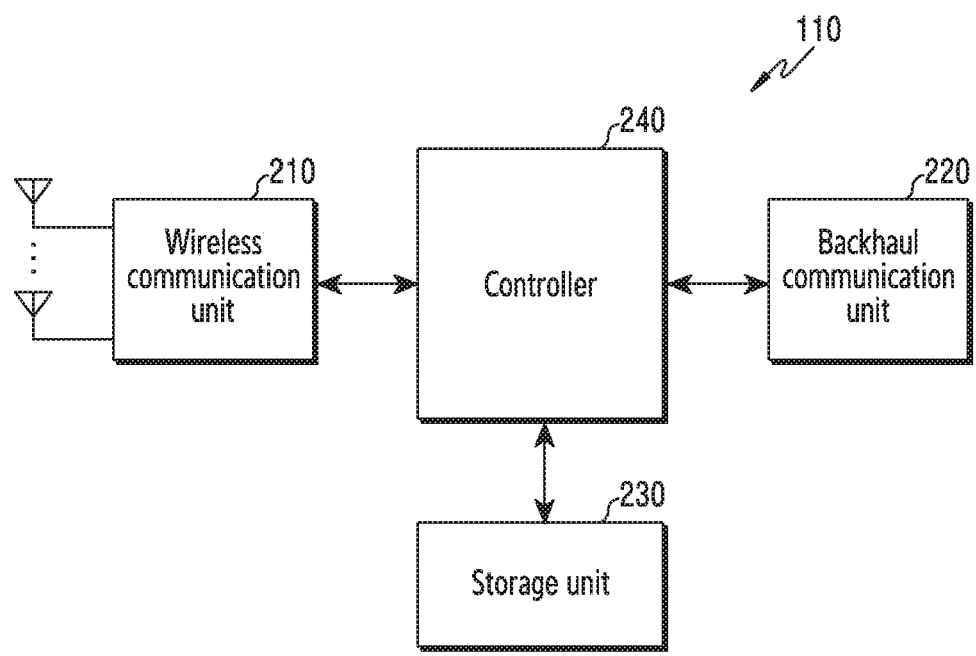
FIG. 2 illustrates the configuration of a BS in a wireless communication system according to an embodiment of the disclosure.

FIG. 2 illustrates the configuration of a BS in a wireless communication system according to an embodiment of the disclosure.

Referring to FIG. 2, the configuration illustrated may be understood as the configuration of the BS 110. The term "unit" or used hereinafter may refer to the unit for processing at least one function or operation and may be implemented in hardware, software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving signals through a wireless channel For example, the communication unit 210 performs a function of conversion between a baseband signal and a bit stream according to a physical layer standard of the system. For example, in data transmission, the communication unit 210 generates complex symbols by encoding and modulating a transmission bit stream. In data reception, the communication unit 210 restores a reception bit stream by demodulating and decoding a baseband signal.

In addition, the wireless communication unit 210 up-converts a baseband signal into a radio-frequency (RF) band signal and transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. Further, the wireless communication unit 210 may include a plurality of transmission/reception paths. In addition, the wireless communication unit 210 may include at least one antenna array consisting of a plurality of antenna elements.

On the hardware side, the wireless communication unit 210 may include a digital unit and an analog unit, and the analog unit may include a plurality of sub-units according to operation power, operation frequency, and the like. The digital unit may be implemented by at least one processor (e.g., a Digital Signal Processor (DSP)).

The wireless communication unit 210 transmits and receives the signal as described above. Accordingly, all or part of the wireless communication unit 210 may be referred to as a "transmitter", a "receiver", or a "transceiver". The transmission and reception performed through a radio channel described in the following description may be understood to mean that the above-described processing is performed by the wireless communication unit 210.

The backhaul communication unit 220 provides an interface for performing communication with other nodes within the network. The backhaul communication unit 220 converts a bit stream transmitted from the base station to another node, for example, another access node, another base station, or a core network, into a physical signal, and converts a physical signal received from another node into a bit stream.

The storage unit 230 stores data, such as a basic program for operating the BS, an application, configuration information, and the like. The storage unit 230 may be configured as a volatile memory, a non-volatile memory, or a combination of a volatile memory and a non-volatile memory. Further, the storage unit 230 provides stored data in response to a request from the controller 240.

The controller 240 controls the overall operation of the BS. For example, the controller 240 transmits and receives a signal through the wireless communication unit 210 or the backhaul communication unit 220. Further, the controller 240 records data in the storage unit 230 and reads the recorded data. The controller 240 may perform the functions of a required protocol stack according to communication standards. According to another implementation, the protocol stack may be included in the wireless communication unit 210. To this end, the controller 240 may include at least one processor. According to various embodiments, the controller 240 may control the eNB to perform operations according to various embodiments described below.

Figure 3:
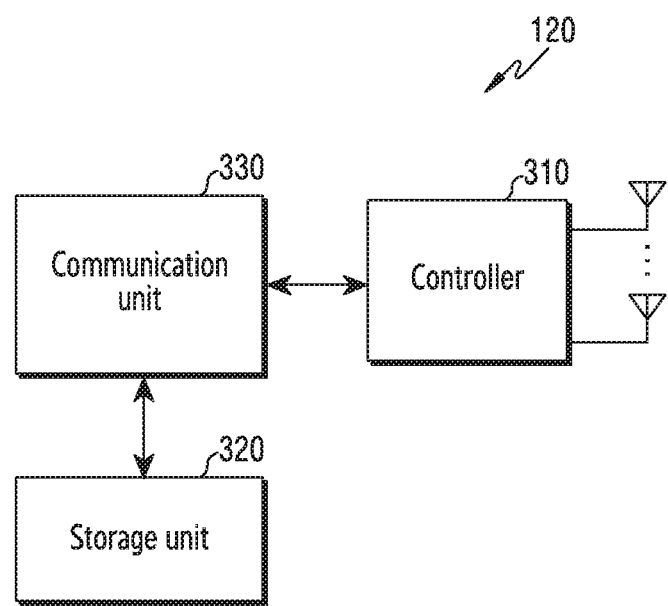
FIG. 3 illustrates the configuration of a terminal in a wireless communication system according to an embodiment of the disclosure.

FIG. 3 illustrates the configuration of the terminal in a wireless communication system according to an embodiment of the disclosure.

Referring to FIG. 3, the configuration illustrated may be understood as the configuration of the terminal 120. The term "unit" or used hereinafter may refer to the unit for processing at least one function or operation and may be implemented in hardware, software, or a combination of hardware and software.

Referring to FIG. 3, the terminal includes a communication unit 310, a storage unit 320, and a controller 330.

The communication unit 310 performs functions for transmitting/receiving a signal through a wireless channel. For example, the communication unit 310 performs a function of conversion between a baseband signal and a bit stream according to a physical layer standard of the system. For example, in data transmission, the communication unit 310 generates complex symbols by encoding and modulating a transmission bit stream. In data reception, the communication unit 310 restores a reception bit stream by demodulating and decoding a baseband signal. In addition, the communication unit 310 up-converts a baseband signal into an RF band signal and then transmits the RF band signal through an antenna, and down-converts an RF band signal received through the antenna into a baseband signal. For example, the communication unit 310 may include a transmission filter, a reception filter, an amplifier, a mixer, an oscillator, a DAC, an ADC, and the like.

The communication unit 310 may include a plurality of transmission/reception paths. In addition, the communication unit 310 may include at least one antenna array consisting of a plurality of antenna elements. On the hardware side, the communication unit 310 may include a digital circuit and an analog circuit (e.g., a Radio Frequency Integrated Circuit: RFIC). The digital circuit and the analog circuit may be implemented as one package. The communication unit 310 may include a plurality of RF chains. The communication unit 310 may perform beamforming.

The communication unit 310 transmits and receives the signal as described above. Accordingly, all or some of the communication unit 310 may be referred to as a "transmitter", a "receiver", or a "transceiver". The transmission and reception performed through a wireless channel, which is described in the following descriptions, may be understood to mean that the above-described processing is performed by the communication unit 310.

The storage unit 320 may store data, such as a basic program for operating the terminal, an application, configuration information, and the like. The storage unit 320 may be configured as a volatile memory, a non-volatile memory, or a combination of a volatile memory and a non-volatile memory. Further, the storage unit 320 provides stored data in response to a request from the controller 330.

The controller 330 controls the overall operation of the terminal. For example, the controller 330 transmits and receives a signal through the communication unit 310. Further, the controller 330 records data in the storage unit 320 and reads the recorded data. The controller 330 may perform functions of the protocol stack required by the communication standard. To this end, the controller 330 may include at least one processor or microprocessor, or may play the part of the processor. Further, the part of the communication unit 310 or the controller 330 may be referred to as a Communication Processor (CP). The controller 330 may control the terminal to perform operations according to various embodiments described below.

Figure 4:
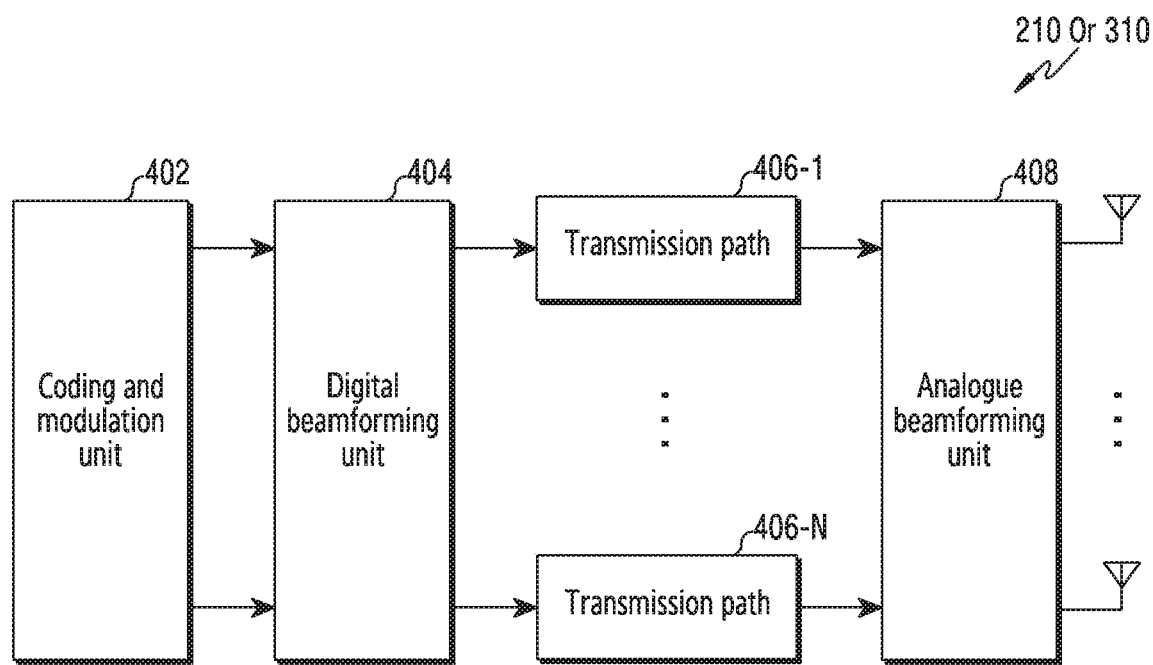
FIG. 4 illustrates the configuration of a communication unit in a wireless communication system according to an embodiment of the disclosure.

FIG. 4 illustrates the configuration of the communication unit in the wireless communication system according to an embodiment of the disclosure. FIG. 4 illustrates an example of the detailed configuration of the wireless communication unit 210 of FIG. 2 or the communication unit 310 of FIG. 3. Specifically, FIG. 4 illustrates elements for performing beamforming as part of the wireless communication unit 210 of FIG. 2 or the communication unit 310 of FIG. 3.

Referring to FIG. 4, the wireless communication unit 210 or the communication unit 310 includes a coding and modulation unit 402, a digital beamforming unit 404, a plurality of transmission paths 406-1 to 406-N, and an analog beamforming unit 408.

The encoding and modulation unit 402 performs channel encoding. For the channel encoding, at least one of a Low-Density Parity Check (LDPC) code, a convolution code, and a polar code may be used. The coding and modulation unit 402 generates modulation symbols by performing constellation mapping.

The digital beamforming unit 404 performs beamforming for a digital signal (e.g., modulation symbols). To this end, the digital beamforming unit 404 multiplies the modulation symbols by beamforming weighted values. The beamforming weighted values may be used for changing the size and phase of the signal, and may be referred to as a "precoding matrix" or a "precoder". The digital beamforming unit 404 outputs the digitally beamformed modulation symbols to the plurality of transmission paths 406-1 to 406-N. According to a Multiple-Input Multiple-Output (MIMO) transmission scheme, the modulation symbols may be multiplexed, or the same modulation symbols may be provided through the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an Inverse Fast Fourier Transform (IFFT) calculation unit, a Cyclic Prefix (CP) insertion unit, a DAC, and an up-conversion unit. The CP insertion unit is for an Orthogonal Frequency Division Multiplexing (OFDM) scheme, and may be omitted when another physical layer scheme (e.g., a Filter Bank Multi-Carrier: FBMC) is applied. The plurality of transmission paths 406-1 to 406-N provides independent signal-processing processes for a plurality of streams generated through the digital beamforming However, depending on the implementation, some of the elements of the plurality of transmission paths 406-1 to 406-N may be used in common.

The analog beamforming unit 408 performs beamforming on analog signals. To this end, the digital beamforming unit 404 multiplies the analog signals by beamforming weighted values. The beamformed weighted values are used to change the size and phase of the signal.

Figure 5:
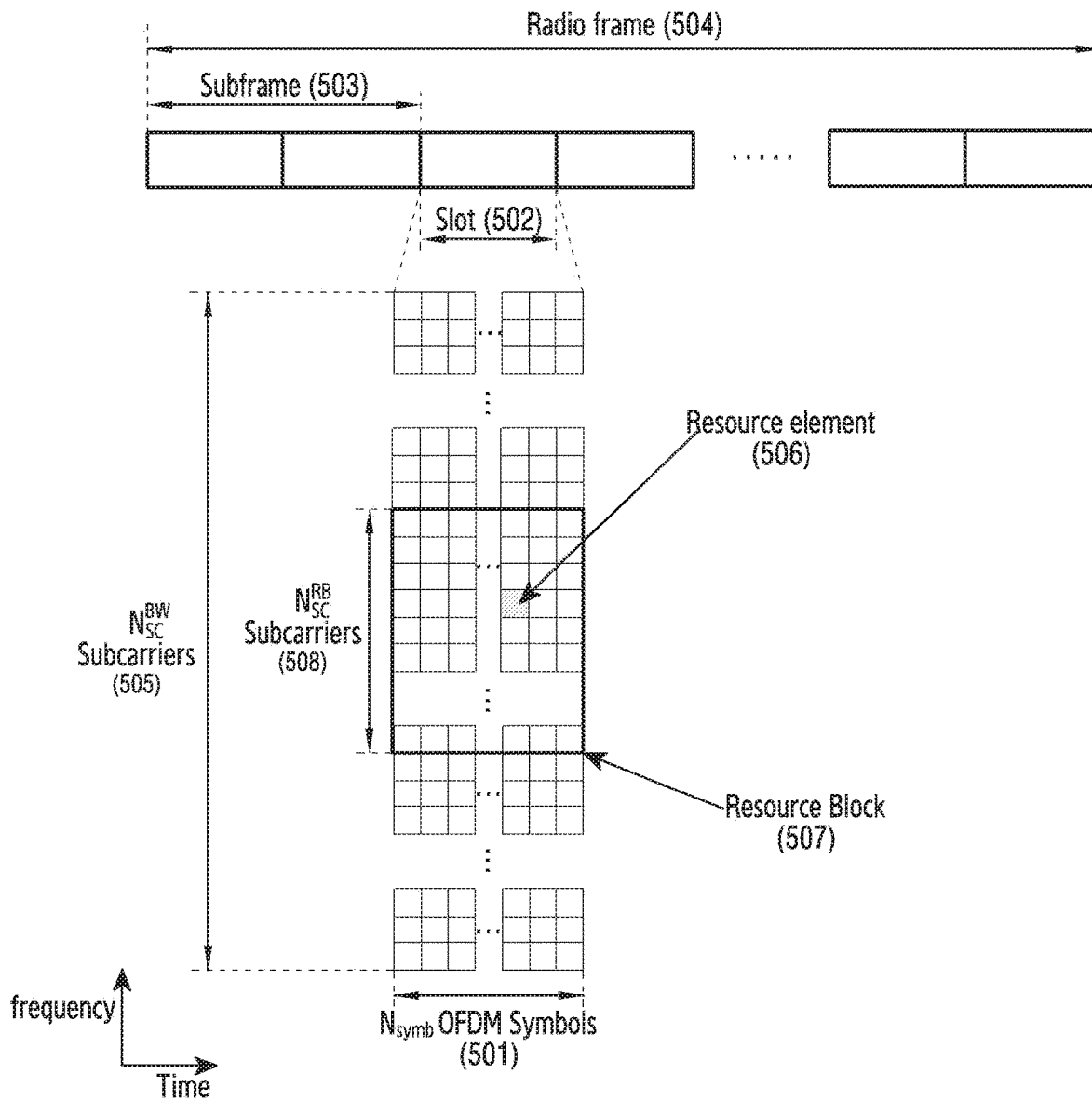
FIG. 5 illustrates the transmission structure of uplink/downlink time-frequency regions in a wireless communication system according to an embodiment of the disclosure.

FIG. 5 illustrates the transmission structure of uplink/downlink time-frequency regions in a wireless communication system according to an embodiment of the disclosure. Specifically, FIG. 5 illustrates the basic structure of time-frequency regions, which are radio resource regions in which data or a control channel is transmitted in uplink/downlink of the NR system or a system similar thereto.

Referring to FIG. 5, the horizontal axis indicates a time region and the vertical axis indicates a frequency region. A minimum transmission unit in the time region is an OFDM symbol or a DFT-s-OFDM symbol, and one slot 502 consists of $N_{symb}$ OFDM or DFT-s-OFDM symbols 501. The OFDM symbol is a symbol in the case in which a signal is transmitted and received using an OFDM multiplexing scheme, and the DFT-s-OFDM symbol is a symbol in the case in which a signal is transmitted and received using a DFT-s-OFDM or SC-FDMA multiplexing scheme. Hereinafter, the disclosure will be described on the basis of the OFDM symbol without distinction between the OFDM symbol and the DFT-s-OFDM symbol for convenience of description, and the description will be made on the basis of downlink signal transmission and reception but can also be applied to uplink signal transmission and reception.

When spacing between subcarriers is 15 kHz, one subframe 503 consists of two slots, and each of the lengths of the slot and the subframe is 1 ms. The number and the length of slots included in one subframe 503 may vary depending on spacing between subcarriers. For example, when the spacing between subcarriers is 30 kHz, one subframe 503 consists of 4 slots. The length of the slot is 0.5 ms, and the length of the subframe is 1 ms. A radio frame 504 is a time region section consisting of 4 subframes. A minimum transmission unit in the frequency region is a subcarrier, and an entire system transmission band (transmission bandwidth) consists of a total of $N_{SC}^{BW}$ subcarriers 505. However, such detailed values may be variable. For example, in the case of the LTE system, the spacing between subcarriers is 15 kHz, but one subframe 503 consists of two slots and the length of the slot is 0.5 ms and the length of the subframe is 1 ms.

A basic unit of resources in the time-frequency regions is a resource element (RE) 506 and may be indicated by an OFDM symbol index and a subcarrier index. A resource block (RB or physical resource block (PRB)) 507 may be defined by $N_{symb}$ consecutive OFDM symbols 501 in the time region and $N_{SCRB}$ consecutive subcarriers 508 in the frequency region. Accordingly, one RB in one slot may include $N_{symb} \times N_{SCRB}$ REs. In general, a minimum allocation unit of data in the frequency region is the RB. In the NR system, generally, $N_{symb}=14$, $N_{SCRB}=12$, and the number $N_{RB}$ of RBs may vary depending on a bandwidth of the system transmission band. In the LTE system, generally, $N_{symb}=7$, $N_{SCRB}=12$, and $N_{RB}$ may vary depending on a bandwidth of the system transmission band.

Downlink control information may be transmitted within first N OFDM symbols in the subframe. In general, N={1, 2, 3}, and the terminal may receive a configuration of the number of symbols through which downlink control information can be transmitted through a higher layer signal from the BS. The BS may change the number of symbols through which downlink control information can be transmitted in every slot according to an amount of control information to be transmitted in the current slot and transfer information on the number of symbols to the terminal through a separate downlink control channel.

In the NR or LTE system, scheduling information of downlink data or uplink data may be transmitted from the BS to the terminal through downlink control information (DCI). The DCI are defined in various formats. A DCI format may indicate whether scheduling information is for uplink data (UP grant) or for downlink data (DL grant), whether it is compact DCI of which the control information is small, whether spatial multiplexing using multiple antennas is applied, whether it is DCI for controlling power. For example, a DCI format (e.g., DCI format 1_0 of NR) which is scheduling control information for downlink data (DL grant) may include at least one of the following control information:

Control information identifier (DCI format identifier): indicates an identifier for identifying a format of received DCI Frequency domain resource assignment: indicates RBs allocated to data transmission Time domain resource assignment: indicates RBs and slots allocated to data transmission VRB-to-PRB mapping: indicates whether to apply a VRB mapping scheme Modulation and coding scheme (MCS): indicates a modulation scheme used for data transmission and the size of a transport block, which is data to be transmitted New data indicator: indicates HARQ initial transmission or HARQ retransmission Redundancy Version (RV): indicates a redundancy version of HARQ HARQ process number: indicates a process number of HARQ PDSCH allocation information (downlink assignment index): indicates, to the terminal, the number of PDSCH reception results (e.g., the number of HARQ-ACKs) to be reported to the BS Transmit power control (TPC) command for Physical Uplink Control Channel (PUCCH): indicates a transmission power control command for a PUCCH which is an uplink control channel PUCCH resource indicator: indicates PUCCH resources used for an HARQ-ACK report including the reception result of a PDSCH configured through corresponding DCI PUCCH transmission timing indicator (PDSCH-to-HARQ feedback timing indicator): indicates information on slots or symbols through which a PUCCH is transmitted for an HARQ-ACK report including the reception result of a PDSCH configured through corresponding DCI The DCI may transmit through a physical downlink control channel (PDCCH) (or control information, hereinafter, the PDCCH is interchangeable with the control information) or an enhanced PDCCH (EPDCCH) (or enhanced control information, hereinafter, the EPDCCH is interchangeable with the enhanced control information) via a channel coding and modulation process.

In general, the DCI is scrambled with a particular radio network temporary identifier (RNTI) or a terminal identifier C-RNTI, independently for each terminal, a cyclic redundancy check (CRC) is added thereto, and channel coding is performed, whereby each independent PDCCH is configured and transmitted. In the time region, the PDCCH is mapped and transmitted during a control channel transmission interval. The mapping location of the PDCCH in the frequency region may be determined by an identifier (ID) of each terminal and distributed and transmitted over the entire system transmission bandwidth.

Downlink data may be transmitted through a physical downlink shared channel (PDSCH), which is a physical channel for downlink data transmission. The PDSCH may be transmitted after the control channel transmission interval, and the detailed mapping location in the frequency region and scheduling information such as the modulation scheme are determined on the basis of the DCI transmitted through the PDCCH.

Via an MCS of the control information included in the DCI, the BS may report the modulation scheme applied to a PDSCH to be transmitted to the terminal and the size (transport block size (TBS)) of data to be transmitted. The MCS may be formed on 5 bits or bits larger or less than 5 bits. The TBS corresponds to the size before channel coding for error correction is applied to the data (TB) to be transmitted by the BS.

Modulation schemes supported by the NR system include Quadrature Phase Shift Keying (QPSK), 16 Quadrature Amplitude Modulation (QAM), 64 QAM, and 256 QAM, and modulation orders (Qm) thereof correspond to 2, 4, and 6, respectively. The BS may transmit 2 bits per symbol in the QPSK modulation, 4 bits per symbol in the 16 QAM modulation, 6 bits per symbol in the 64 QAM modulation, and 8 bits per symbol in the 256 QAM modulation. Modulation schemes higher than 256 QAM may also be used according to system deformation.

In the NR system, a downlink HARQ adapts an asynchronous HARQ scheme in which a data retransmission time point is not fixed. For example, when the BS receives a HARQ NACK feedback of initially transmitted data, which the BS transmits, from the terminal, the BS freely determines the time point at which the data is retransmitted via a scheduling operation. For the HARQ operation, the terminal may buffer data which is determined as an error on the basis of the result of decoding of the received data and then combine the data with the data retransmitted by the BS. HARQ ACK/NACK information of a PDSCH transmitted in subframe n-k may be transmitted from the terminal to the BS through a PUCCH or a PUSCH in subframe n. In the case of the 5G communication system such as NR, k may be transmitted while being included in DCI indicating or scheduling reception of the PDSCH transmitted in subframe n-k or may be configured in the terminal through a higher layer signal. The BS may configure one or more k values through a higher layer signal and indicate a specific k value through DCI. Here, k may be determined according to a minimum time required for HARQ-ACK processing capability of the terminal, in other words, required to receive the PDSCH, and generate and report the HARQ-ACK of the PDSCH. Further, the terminal may use a predefined value or a default value before the k value is configured.

The above description has been made on the basis of the NR system for description of the wireless communication system and the apparatus and the method proposed by embodiments of the disclosure, the disclosure is not limited to the NR system and may be applied to various wireless communication systems such as LTE, LTE-A, LTE-A-Pro, and 5 G. Further, the disclosure is described on the basis of a system and a device for transmitting and receiving a signal through an unlicensed band but may be applied to a system operating in a licensed band.

Hereinafter, in the disclosure, higher layer signaling or a higher layer signal is a method of transmitting a signal from the BS to the terminal through a downlink data channel of a physical layer or from the terminal to the BS through an uplink data channel of a physical layer, and may include a method of transmitting a signal through RRC signaling, PDCP signaling, or a MAC Control Element (CE). The higher layer signaling or the higher layer signal may include system information, for example, a System Information Block (SIB) transmitted to a plurality of terminals in common.

In a system performing communication in an unlicensed band, a transmission device (the BS or the terminal) to transmit a signal through the unlicensed band may perform a channel access procedure (or Listen-Before Talk (LBT)) for the unlicensed band through which the transmission device desires to perform communication before transmitting the signal, and when it is determined that the unlicensed band is in an idle state according to the channel access procedure, access the unlicensed band and transmit the signal. When it is determined that the unlicensed band is not in the idle state according to the performed channel access procedure, the transmission device cannot transmit the signal.

In the channel access procedure in the unlicensed band, the transmission device generally measures an intensity of a signal received in the unlicensed band during a fixed time or a time calculated according to a predefined rule (e.g., a time calculated through one random value selected by at least the BS or the terminal) and compare the signal with a predefined threshold value or a threshold value calculated by a function for determining the intensity of the received signal, the function including at least one parameter, such as a channel bandwidth, a signal bandwidth in which the signal to be transmitted is transmitted, an intensity of transmission power, so as to determine whether the unlicensed band is in the idle state.

For example, the transmission may measure the intensity of the signal for X us (e.g., 25 us) right before the signal is transmitted, and when the measured intensity of the signal is smaller than a predefined threshold value or a calculated threshold value T (e.g., −72 dBm), the transmission device may determine that the unlicensed band is in the idle state and transmit the configured signal. A maximum time during which the signal can be successively transmitted after the channel access procedure may be limited according to a Maximum Channel Occupancy Time (MCOT) defined for each country, each region, or each frequency band, or the type of the transmission device (e.g., the BS, the terminal, a master device, or a slave device). For example, in the case of Japan, after performing the channel access procedure in an unlicensed band of 5 GHz, the BS or the terminal may occupy a channel during a maximum of 4 ms in an unlicensed band determined to be in the idle state without additional channel access procedure and transmit a signal.

When the BS or the terminal desires to transmit a downlink signal or an uplink signal in the unlicensed band, the channel access procedure which can be performed by the BS or the terminal may be divided into at least the following types:

Type 1: an uplink signal or a downlink signal is transmitted after a channel access procedure during a variable time Type 2: an uplink signal or a downlink signal is transmitted after a channel access procedure during a fixed time Type 3: a downlink signal or an uplink signal is transmitted without any channel access procedure Hereinafter, the disclosure interchangeably describes the case in which the BS transmits a downlink signal to the terminal through an unlicensed band and the case in which the terminal transmits an uplink signal to the BS through an unlicensed band, but the description of the disclosure may be equally applied to the case in which terminal transmits an uplink signal to the BS through an unlicensed band and the case in which the BS transmits a downlink signal to the terminal through an unlicensed band or some modifications thereof may be applied. Accordingly, detailed description of downlink signal transmission and reception is omitted. Further, the disclosure assumes that one piece of data information (codeword or TB) or uplink data information is transmitted and received between the BS and the terminal. However, the description of the disclosure may also be applied to the case in which the BS transmits downlink signals to a plurality of terminals or the case in which a plurality of codewords or TBs are transmitted and received between the BS and the terminal.

A transmission node (hereinafter referred to as the BS or the terminal) which desires to transmit a signal through an unlicensed band may determine a channel access procedure scheme according to the type of the signal to be transmitted. For example, when the BS desires to transmit a downlink signal including a downlink data channel in the unlicensed band, the BS may perform a channel access procedure of type 1. When the BS desires to transmit a downlink signal, which does not include a downlink data channel, for example, a synchronization signal or a downlink control channel, in the unlicensed band, the BS may perform a channel access procedure of type 2 and transmit the downlink signal.

The channel access procedure scheme may be determined according to a length of transmission of the signal to be transmitted in the unlicensed band or a length of a time or an interval occupying and using the unlicensed band. In general, it takes a longer time to perform the channel access procedure in type 1 than the channel access procedure in type 2. Accordingly, when a signal is transmitted during a short time interval or a time equal to or shorter than a reference time (e.g., X ms or Y symbols), the channel access procedure of type 2 may be performed. On the other hand, when a signal is transmitted during a long time interval or a time longer than or equal to a reference time (e.g., X ms or Y symbols), the channel access procedure of type 1 may be performed. In other words, channel access procedures of different types may be performed according to an unlicensed band use time.

When the channel access procedure of type 1 is performed according to at least one of the references, a channel access priority class may be determined according to a Quality of service Class Identifier (QCI) of a signal to be transmitted in the unlicensed band, and the channel access procedure may be performed using at least one value of the predefined configuration values shown in Table 1 for the determined channel access priority class. For example, QCIs 1, 2, and 4 are QCI values for services such as conversational voice, conversational video (live streaming), and non-conversational video (buffered streaming), respectively. When a signal for a service that does not match the QCI in Table 1 is transmitted in the unlicensed band, a QCI, which is the closest to the service and the QCI in Table 1 may be selected and a channel access priority class therefor may be selected.

Table 1 shows the mapping relationship between the channel access priority class and the Quality of service Class Identifier (QCI).

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

For example, defer duration, a set (CW_p) of values or sizes of contention window values, a minimum value and a maximum value (CW_min, p and CW_max, p) of the contention window, and a maximum channel occupation interval (T_mcot, p) according to the determined channel access priority class (p) may be determined through Table 2. In other words, the BS which desires to transmit a downlink signal through the unlicensed band, performs a channel access procedure for the unlicensed band during a minimum of T_f+m_p*T_sl time. When the channel access procedure is performed by channel access priority class 3 (p=3), the size T_f+m_p*T_sl of the defer duration required to perform the channel access procedure may be configured using m_p=3. When it is determined that the unlicensed band is in the idle state during the m_p*T_sl time, N=N−1. N is selected as a random integer value between 0 and the value of the contention window (CW_p) at the time point at which the channel access procedure is performed. In the case of channel access priority class 3, the minimum contention window and the maximum contention window are 15 and 63, respectively. When it is determined that the unlicensed band is in the idle state in the defer duration and an interval in which an additional channel access procedure is performed, the BS may transmit a signal through the unlicensed band for a time of T_mcot, p (8 ms). Table 2 shows channel access priority classes in downlink. Although the disclosure is described using downlink channel access priority classes for convenience of description, the channel access priority classes in Table 2 may be reused or channel access priority classes for uplink transmission may be defined and used in uplink.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window (CW_p) is a minimum value of the contention window (CW_min, p). The BS selecting N performs the channel access procedure in the T_sl interval, and when determining that the unlicensed band is in the idle state through the channel access procedure performed in the T_sl interval, change N into N-1 (N=N-1). When N=0, the BS may transmit a signal during a maximum of T_mcot, p time through the unlicensed band. When the unlicensed band determined through the channel access procedure in the time T_sl is not in the idle state, the channel access procedure may be performed again without any change in N.

The value of the contention duration (CW_p) may be changed on the basis of the reception result of a downlink data channel in a reference subframe or a reference slot during an interval (MCOT) in which the BS most recently transmits the downlink signal through the unlicensed band at a time point at which the BS initiates the channel access procedure or a time point at which or right before the BS selects N in order to perform the channel access procedure. The BS may receive a report on the reception result of the downlink data transmitted in the reference subframe or the reference slot from the terminal and increase or minimize the size of CW_p according to a ratio (Z) of NACK in the received report on the reception result.

Figure 6:
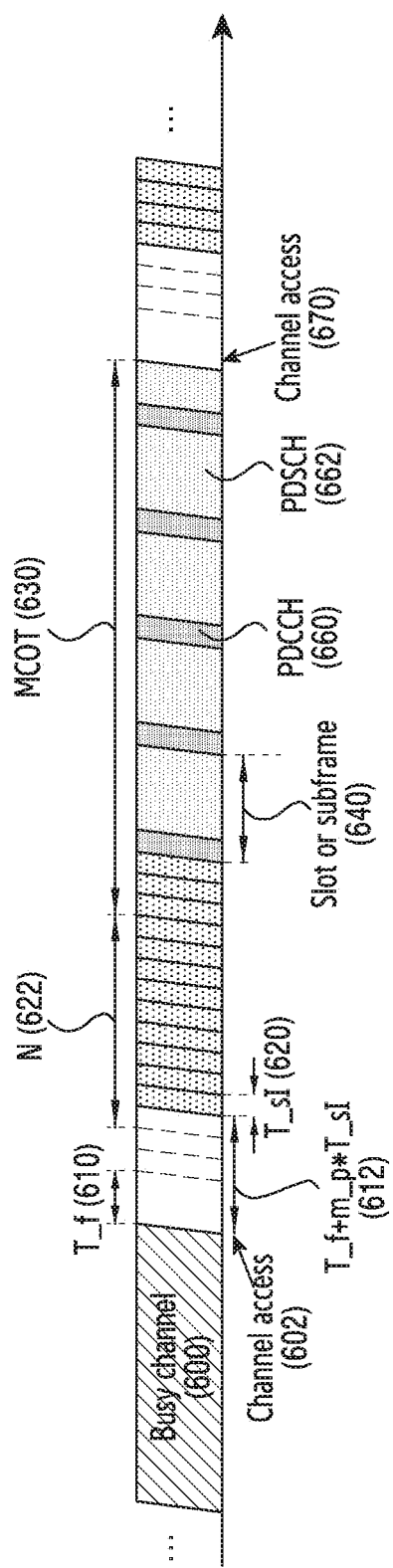
FIG. 6 illustrates a channel access procedure in an unlicensed band according to an embodiment of the disclosure.

FIG. 6 illustrates a channel access procedure in an unlicensed band according to an embodiment of the disclosure.

Referring to FIG. 6, a first transmission interval 640 (hereinafter referred to as a slot or a subframe) of an interval 630 in which a downlink signal most recently transmitted through the unlicensed band at a time point 670 at which the BS initiates the channel access procedure or a time point (602) at which or right before the BS selects N (622) in order to perform the channel access procedure is a reference slot for changing the contention duration for the channel access procedure. When the BS cannot receive the report on the reception result of the downlink data channel transmitted in the first slot 640 of the transmission interval 630, for example, when a time interval between the first subframe and the time point 670 at which the BS initiates the channel access procedure is n slots or subframes or smaller, (i.e., when the BS initiates the channel access procedure before the time at which the terminal can report the reception result of the downlink data channel for the first subframe 640), the first subframe of the most recent downlink signal transmission interval before the downlink signal transmission interval 630 is the reference subframe. When the BS cannot receive the reception result of the downlink data transmitted in the reference subframe 640 from the terminal at the time point 670 at which the BS initiates the channel access procedure or the time point at which or right before the BS selects N in order to perform the channel access procedure, the BS may determine the first subframe of the most recent downlink signal transmission interval among the reception result of the downlink data channel already received from terminals as the reference frame For the downlink data transmitted through the downlink data channel in the reference subframe, the BS may determine the size of the contention window used for the channel access procedure 670 on the basis of the reception result of the downlink data received from terminals.

For example, the BS transmitting a downlink signal through a channel access procedure (e.g., CW_p=15) configured through channel access priority type 3 (p=3) may increase the contention interval from an initial value (CW_p=15) to the next contention interval value (CW_p=31) when it is determined that reception results of 80% or more are NACK among the reception results of the terminal for downlink data transmitted to the terminal through a downlink data channel in a first subframe among downlink signals transmitted through the unlicensed band.

When the reception result of 80% or more is not determined as NACK among the reception result of the terminal, the BS may maintain the value of the contention interval as the existing value or change the same to an initial value of the contention interval. The change in the contention interval may be applied to all types of the channel access priority in common or applied only to the channel access priority used for the channel access procedure. A method of determining the reception result valid for determining the change in the size of the contention interval, or a method of determining a Z value among the reception result of downlink data which the terminal transmits or reports to the BS for downlink data transmitted through a downlink data channel in a reference subframe or a reference slot for determining the change in the size of the contention interval is described below.

In the case in which the BS transmits one or more codewords or TBs to one or more terminals in the reference subframe or the reference slot, the BS may determine the Z value as a radio of NACK to the reception results transmitted or reported by the terminal for the TBs received in the reference subframe or the reference slot. For example, when two codewords or two TBs are transmitted to one terminal in the reference subframe or the reference slot, the BS receives the downlink data signal reception result for two TBs or receives a report thereon from the terminal. When the ration (Z) of NACK to the two reception results is larger than or equal to a threshold value (e.g., Z=80%) predefined or configured between the BS and the terminal, the BS may change or increase the size of the contention interval.

When the terminal bundles the downlink data reception results for one or more subframes (e.g., M subframes) including the reference subframe or slot and transmits or report the same to the BS, the BS may determine that the terminal transmits M reception results. The BS may determine the Z value as the ratio of NACK to the M reception results and change, maintain, or initialize the size of the contention interval.

When the reference subframe is the reception result for a second slot among two slots included in one subframe, the terminal may determine the Z value as the ratio of NACK to the reception results transmitted or reported to the BS for downlink data received in the reference subframe (in other words, the second slot) and the next subframe.

When scheduling information for a downlink data channel transmitted by the BS or downlink control information is transmitted in a cell or a frequency band which is the same as a cell or a frequency band in which the downlink data channel is transmitted or when scheduling information for a downlink data channel transmitted by the BS or downlink control information is transmitted in an unlicensed band or transmitted in a cell or a frequency band which is different from a cell in which the downlink data channel is transmitted, the BS may determine the reception result of the terminal as NACK and determine the Z value in the case in which it is determined that the reception result for downlink data received by the terminal in the reference subframe or the reference slot and the case in which the reception result for downlink data transmitted by the terminal is determined as DTX, NACK/DTX, or any state.

When scheduling information of a downlink data channel transmitted by the BS or downlink control information is transmitted through a licensed band, the BS may omit the reception result of the terminal in the reference value Z of a contention interval change in the case in which the reception result for downlink data transmitted by the terminal is determined as DTX, NACK/DTX, or any state In other words, the BS may ignore the reception result of the terminal and determine the Z value.

When the BS transmits scheduling information of a downlink data channel or downlink control information through a licensed band, the BS may ignore the reception result transmitted or reported by the terminal for downlink data and determine the Z value in the case in which the BS actually transmit no downlink data (no transmission) in the reception result of the downlink data for the reference subframe or the reference slot transmitted or reported to the BS by the terminal.

The 5G system is required to flexibly define and operate the frame structure in consideration of various services and requirements. For example, respective services may be considered to have different subcarrier spacings according to requirements. A plurality of subcarrier spacings supported by the current 5G communication system may be determined using Equation (1) below.

$$\Delta f = f_0 \cdot 2^m \qquad \text{Equation (1)}$$

In Equation (1), $f_0$ denotes basic subcarrier spacing of the system and m denotes an integer scaling factor. For example, when $f_0$ is 15 kHz, a set of subcarrier spacings which the 5G communication system can have may include 3.75 kHz, 7.5 kHz, 15 kHz, 30 kHz, 60 kHz, 120 kHz, 240 kHz, and 480 kHz. The set of available subcarrier spacings may be different according to a frequency band. For example, 3.75 kHz, 7.5 kHz, 15 kHz, 30 kHz, and 60 kHz may be used in a frequency band equal to or lower than 6 GHz, and 60 kHz, 120 kHz, and 240 kHz may be used in a frequency band higher than or equal to 6 GHz.

The length of the corresponding OFDM symbol may vary depending on the subcarrier spacing included in the OFDM symbol. This is because the subcarrier spacing and the length of the OFDM symbol have the reciprocal relationship therebetween on the basis of the characteristic of the OFDM symbol. For example, the symbol length becomes ½ when the subcarrier spacing is twice and the symbol length becomes twice when the subcarrier spacing is ½.

Next, a resource region in which a data channel is transmitted in the 5G communication system will be described.

Figure 7A:
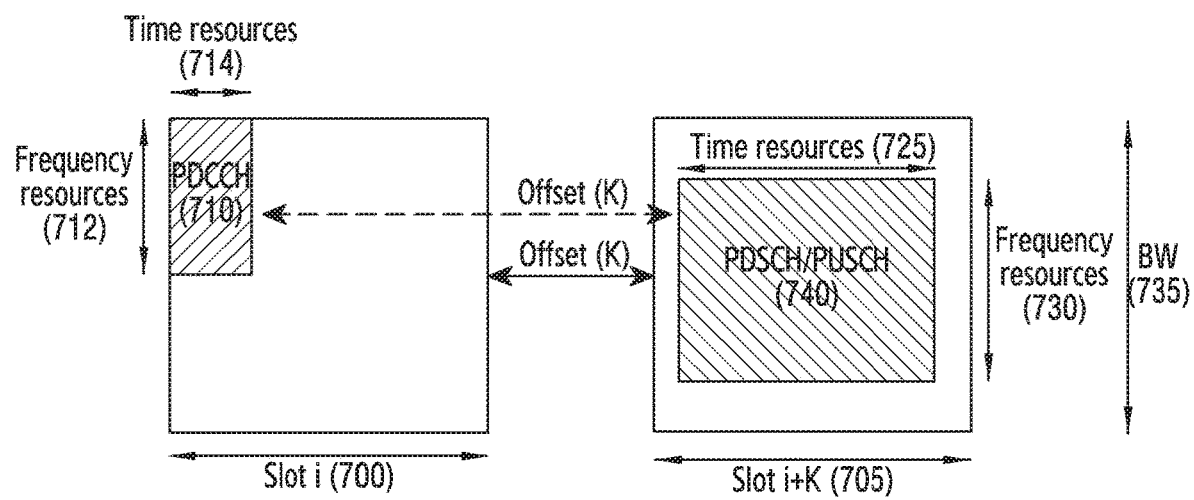
FIG. 7A illustrates a method of scheduling downlink or uplink and a resource region in a wireless communication system according to an embodiment of the disclosure.

FIG. 7A illustrates a method of scheduling downlink or uplink and a resource region in a wireless communication system according to an embodiment of the disclosure. Specifically, FIG. 7A illustrates a resource region in which a data channel is transmitted in the 5G communication system.

Referring to FIG. 7A, the terminal monitors or searches for a PDCCH 710 in a downlink control channel (hereinafter referred to as a PDCCH) region (hereinafter referred to as a control resource set, a CORESET, or a Search Space (SS)) configured by the BS through a higher layer signal. The downlink control channel region may include information on a time region 714 and a frequency region 712, and the information on the time region 714 may be configured in units of symbols and the information on the frequency region 712 may be configured in units of RBs or groups of RBs. When the terminal detects the PDCCH 710 in slot i 700, the terminal acquires Downlink Control Information (DCI) transmitted through the detected PDCCH 710. Through the received downlink control information (DCI), the terminal may acquire scheduling information of a downlink data channel or an uplink data channel. In other words, the DCI may include information on a resource region or PDSCH transmission region through which the terminal should receive a downlink data channel (hereinafter referred to as a PDSCH) transmitted from the BS or information on a resource region which the terminal receives from the BS for transmission of an uplink data channel (hereinafter referred to as a PUSCH).

The case in which the terminal receives scheduling of transmission of the uplink data channel (PUSCH) will be described by way of example. The terminal receiving the DCI may acquire a slot index for receiving the PUSCH through the DCI or offset information (K) and determine a PUSCH transmission slot index. For example, the terminal may determine that scheduling is performed to transmit the PUSCH in slot i+K 705 through the received offset information (K) on the basis of slot index i 700 through which the PDCCH 710 is received. The terminal may also determine slot i+K 705 or a PUSCH start symbol or time in slot i+K through the received offset information (K) on the basis of the control resource set (CORESET) through which the PDCCH 710 is received. Further, the terminal may acquire information on a time-frequency resource region 740 in the PUSCH transmission slot 705 on the basis of the DCI. PUSCH transmission frequency resource region information 730 may be PRB unit information or PRB group unit information. Meanwhile, the PUSCH transmission frequency resource region information 730 is a region included in an initial uplink bandwidth (initial bandwidth (BW)) 735 determined or received by the terminal through an initial access procedure or an initial uplink bandwidth part (initial bandwidth part (BWP)). When the terminal receives the configuration of the uplink bandwidth (BW) or the uplink bandwidth part (BPW) through a higher layer signal, the PUSCH transmission frequency resource region information 730 is a region included in the uplink bandwidth (BW) configured through a higher layer signal or an uplink bandwidth part (BWP).

The PUSCH transmission time resource region information 725 may be symbol unit information or symbol group unit information or may be information indicating absolute time information. The PUSCH transmission time resource region information 725 may be indicated by a combination of the PUSCH transmission start time or symbol and the PUSCH length or the PUSCH end time or symbol and may be included in the DCI as one field or value. The PUSCH transmission time resource region information 725 may be included in the DCI as a field or a value indicating each of the PUSCH transmission start time or symbol and the PUSCH length or the PUSCH end time or symbol. The terminal may transmit the PUSCH in the PUSCH transmission resource region 740 determined through the DCI.

The control regions in the 5G system may be configured in the terminal through higher-layer signaling, for example, system information, a Master Information Block (MIB), or radio resource control (RRC) signaling by the BS. Configuring the control region in the terminal by the BS means that the BS provides information on an identifier of the control region, a frequency location of the control region, and a symbol length of the control region to the terminal.

Figure 7B:
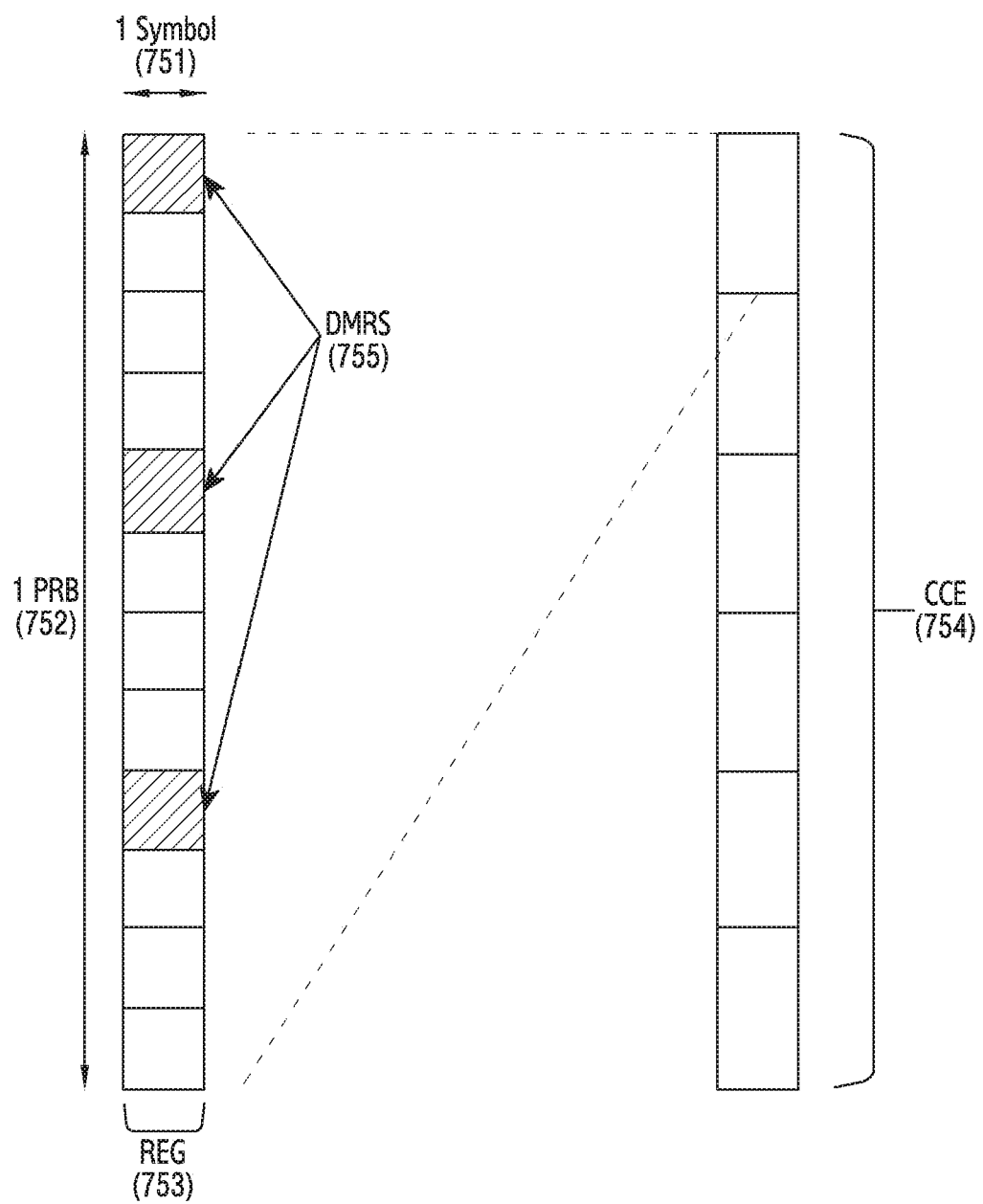
FIG. 7B illustrates a downlink resource region in a wireless communication system according to an embodiment of the disclosure.

FIG. 7B illustrates a downlink resource region in a wireless communication system according to an embodiment of the disclosure. Specifically, FIG. 7B illustrates an example of a basic unit of time and frequency resources including a downlink control channel which can be used in the 5G communication system.

Referring to FIG. 7B, the basic unit of time and frequency resources including the control channel is referred to as a Resource Element Group (REG) 753. The REG 753 may be defined by 1 OFDM symbol 751 on the time axis and 1 Physical Resource Block (PRB) 752 on the frequency axis, that is, 12 subcarriers. Through concatenation of REGs 753, a downlink control channel allocation unit may be configured.

As illustrated in FIG. 7B, when the basic unit for allocating the downlink control channel in the 5G system is a Control Channel Element (CCE) 754, 1 CCE 754 may consist of a plurality of REGs 753. The REG 753 illustrated in FIG. 7 is described by way of example. The REG 753 may consist of 12 REs, and when 1 CCE 754 consists of 6 REGs 753, 1 CCE 754 may consists of 72 REs. When a downlink control region is configured, the corresponding region may include a plurality of CCEs 754, and a particular downlink control channel may be mapped to one or a plurality of CCEs 754 according to an Aggregation Level (AL) within the control region and then transmitted. The CCEs 754 within the control region may be identified by numbers, and the numbers may be assigned according to a logical mapping scheme.

The basic unit of the downlink control channel illustrated in FIG. 7, that is, the REG 753, may include all of the REs to which the DCI is mapped and the region to which DMRSs 755, which are reference signals for decoding the REs, are mapped. Referring to FIG. 7B, 3 DMRSs 755 may be transmitted within 1 REG 753.

The number of CCEs required to transmit the PDCCH may be 1, 2, 4, 8, or 16 according to the Aggregation Level (AL), and the different number of CCEs may be used to implement link adaptation of the downlink control channel For example, in the case of AL=L, one downlink control channel may be transmitted through L CCEs. The terminal is required to detect a signal in the state in which the terminal is not aware of information on the downlink control channel, and a search space indicating a set of CCEs may be used to assist such a blind decoding. The search space is a set of downlink control channel candidates including CCEs for which the terminal attempts decoding at a given aggregation level. Since there are a plurality of aggregation levels for one group including 1, 2, 4, 8, or 16 CCs, the terminal has a plurality of search spaces. A search space set may be defined as a set of search spaces at all the configured aggregation levels.

The search space may be classified into a common search space and a terminal (UE)-specific search space. Terminals in a predetermined group or all terminals may search for a common search space of the PDCCH in order to receive dynamic scheduling of system information or cell-common control information such as a paging message. For example, PDSCH scheduling information for transmission of an SIB including information on a service provider of a cell may be received by searching for a common-search space of the PDCCH. In the case of the common-search space, terminals in a predetermined group or all terminals should receive the PDCCH, so that the common-search space may be defined as a set of pre-arranged CCEs. Scheduling allocation information of the terminal-specific PDSCH or PUSCH may be received by searching for a UE-specific search space of the PDCCH. The UE-specific search space may be terminal-specifically defined as a terminal identity and a function of various system parameters.

In the 5G system, parameters for the PDCCH search space may be configured in the terminal by the BS through higher layer signaling, for example, SIB, MIB, or RRC signaling. For example, the BS may configure, in the terminal, the number of PDCCH candidates at each aggregation level L, a monitoring period of the search space, a monitoring occasion in units of symbols within the slot for the search space, a search space type, that is, a common-search space or a terminal-specific search space, a combination of a DCI format and an RNTI to be monitored in the corresponding search space, and a control region index for monitoring the search space. For example, the BS may configure configuration information of Table 3 in the terminal.

TABLE 3

```
SearchSpace ::=                SEQUENCE {
-- Identity of the search space. SearchSpaceId=0 identifies the
SearchSpace configured via PBCH (MIB) or ServingCellConfigCommon.
searchSpaceId            SearchSpaceId,
(search space identity)
controlResourceSetId        ControlResourceSetId,
(control region identity)
monitoringSlotPeriodictyAndOffset     CHOIC {
(monitoring slot level period)
  sl1              NULL,
  sl2              INTEGER (0..1),
  sl4              INTEGER (0..3),
  sl5             INTEGER ((0..4),
  sl8              INTEGER (0..7),
  sl10              INTEGER (0..9),
  sl16              INTEGER (0..15),
  sl20              INTEGER (0..19)
}
        OPTIONAL,
monitoringSymbolsWithinSlot      BIT STRING (SIZE (14))
          OPTIONAL,
(monitoring symbols within slot)
nrofCandidates          SEQUENCE {
(number of candidates for each aggregation level)
  aggregationLevel1        ENUMERATED {n0, n1, n2, n3, n4, n5,
  n6, n8},
  aggregationLevel2        ENUMERATED {n0, n1, n2, n3, n4, n5,
  n6, n8},
  aggregationLevel4        ENUMERATED {n0, n1, n2, n3, n4, n5,
  n6, n8},
  aggregationLevel8        ENUMERATED {n0, n1, n2, n3, n4, n5,
  n6, n8},
  aggregationLevel16         ENUMERATED {n0, n1, n2, n3, n4,
  n5, n6, n8}
},
searchSpaceType         CHOICE {
(search space type)
-- Configures this search space as common search space (CSS) and DCI
formats to monitor.
common          SEQUENCE {
(common search space)
  }
ue-Specific          SEQUENCE {
(UE-specific search space)
```

TABLE 3-continued

```
-- Indicates whether the UE monitors in this USS for DCI formats 0-
0 and 1-0 or for formats 0-1 and 1-1.
    formats           ENUMERATED {formats 0-0-And-1-0,
  formats 0-1-And-1-1{,
    ...
}
```

According to configuration information of Table 3, the BS may configure one or a plurality of search space sets in the terminal. For example, the BS may configure search space set 1 and search space 2 in the terminal, and the configuration may be performed such that DCI format A scrambled by an X-RNTI in search space set 1 is monitored in the common-search space and DCI format B scrambled by a Y-RNTI in search space set 2 is monitored in the terminal-specific search space.

According to configuration information of Table 3, one or a plurality of search space sets may exist in the common-search space or the terminal-specific search space. For example, search space set #1 and search space set #2 may be configured as common-search spaces, and search space set #3 and search space set #4 may configured as terminal-specific search spaces.

In the common-search space, the following combinations of DCI formats and RNTIs may be monitored:

DCI format 0_0/1_0 with CRC scrambled by C-RNTI, CS-RNTI, SP-CS-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the terminal-specific search space, the following combinations of DCI formats and RNTIs may be monitored:

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The aforementioned RNTIs may comply with the following definitions and purposes:

Cell RNTI (C-RNTI): used for scheduling terminal-specific PDSCH

Temporary Cell RNTI (TC-RNTI): used for scheduling terminal-specific PDSCH

Configured Scheduling RNTI (CS-RNTI): used for scheduling semi-statically configured terminal-specific PDSCH Random Access RNTI (RA-RNTI): used for scheduling PDSCH at random access stage Paging RNTI (P-RNTI): used for scheduling PDSCH through which paging is transmitted System Information RNTI (SI-RNTI): used for scheduling PDSCH through which system information is transmitted Interruption RNTI (INT-RNTI): used for indicating whether puncturing is performed for PDSCH Transmit Power Control for PUSCH RNTI (TPC-PUSCH-RNTI): used for indicating PUSCH power control command Transmit Power Control for PUCCH RNTI (TPC-PUCCH-RNTI): used for indicating PUCCH power control command Transmit Power Control for SRS RNTI (TPC-SRS-RNTI): used for indicating SRS power control command In the 5G system, as a plurality of search space sets may be configured by different parameters, for example, DCI formats, a search space set monitored by the terminal at every time point may vary. For example, when search space set #1 is configured according to an X-slot period, search space set #2 is configured according to a Y-slot period, and X and Y are different, the terminal may monitor both search space set #1 and search space set #2 in a specific slot and monitor one of search space set #1 and search space set #2 in another specific slot.

When a plurality of search space sets are configured in the terminal, the following conditions may be considered for a method of determining a search space set to be monitored by the terminal.

[Condition 1: Limits on the Maximum Number of PDCCH Candidates]

The number of PDCCH candidates which can be monitored per slot does not exceed $M^\mu$. $M^\mu$ may be defined as the maximum number of PDCCH candidates per slot in a cell configured to have subcarrier spacing of $15 \cdot 2^\mu$ kHz as shown in Table 4 below.

TABLE 4

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limits on the Maximum Number of CCEs]

The number of CCEs included in all search spaces per slot does not exceed $C^\mu$. All search spaces are all CCE sets corresponding to a union region of a plurality of search spaces. $C^\mu$ may be defined as the maximum number of CCEs per slot in a cell configured to have subcarrier spacing of $15 \cdot 2^\mu$ kHz as shown in Table 5 below.

TABLE 5

| μ | Maximum number of CCEs per slot and per serving cell ($C^\mu$) |
|---|---|
| 0 | 56 |
| 1 | 56 |
| 2 | 48 |
| 3 | 32 |

For convenience of description, a condition that satisfies both [Condition 1] and [Condition 2] at a specific time point is defined as [Condition A]. Accordingly, not satisfying condition A may mean that at least one of [Condition 1] and [Condition 2] is not satisfied.

[Condition A] may not be satisfied at a specific time point according to configuration of search space sets by the BS. When [Condition A] is not satisfied at a specific time point, the terminal may select and monitor only some of the search space sets configured to satisfy [Condition A] at the corresponding time point, and the BS may transmit the PDCCH through the selected search space sets.

A method of selecting some search spaces from among all the configured search space sets may include the following method.

Method 1: Method of Selecting Some Search Spaces of All the Configured Search Space Sets.

When [Condition A] for the PDCCH is not satisfied at a specific time point, that is, in a specific slot, the terminal or the BS may select a search space set of which a search space type is configured as a common-search space among search space sets existing at the corresponding time point in preference to a search space set of which a search space type is configured as a terminal-specific search space.

When all search space sets of which the search space type is configured as the common-search space are selected, that is, when [Condition A] is satisfied even after all search spaces of which the search space type is configured as the common-search space are selected, the terminal or the BS may select search space sets of which the search space type is configured as the terminal-specific search space. When the number of search space sets of which the search space type is configured as the terminal-specific search space is plural, a search space set having a lower search space set index may have a higher priority. Terminal-specific search space sets may be selected within a range in which [Condition A] is satisfied in consideration of the priority.

In the case of the 5G communication system, an uplink signal may be transmitted without uplink scheduling information in order to provide various services and support a high data transmission rate. More specifically, when an uplink signal is transmitted without uplink scheduling information, resource allocation information and MCS information for uplink transmission may be configured through RRC signaling or DCI of the PDCCH, and uplink transmission which can be performed may be divided into at least the following types according to uplink transmission configuration reception types:

Type a: configuration of uplink transmission using RRC signaling

Figure 8A:
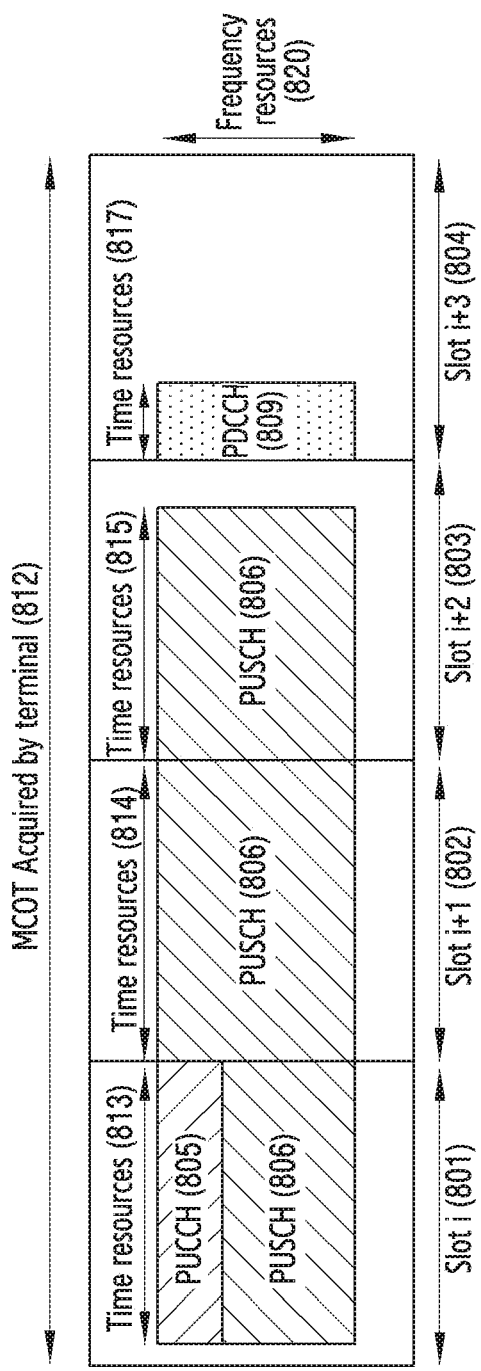
FIG. 8A illustrates a downlink or uplink scheduling method and a resource region in a wireless communication system according to an embodiment of the disclosure.

Type b: configuration of uplink transmission using an uplink data channel of a physical layer FIG. 8A illustrates a downlink or uplink scheduling method and a resource region in a wireless communication system according to an embodiment of the disclosure.

Figure 8B:
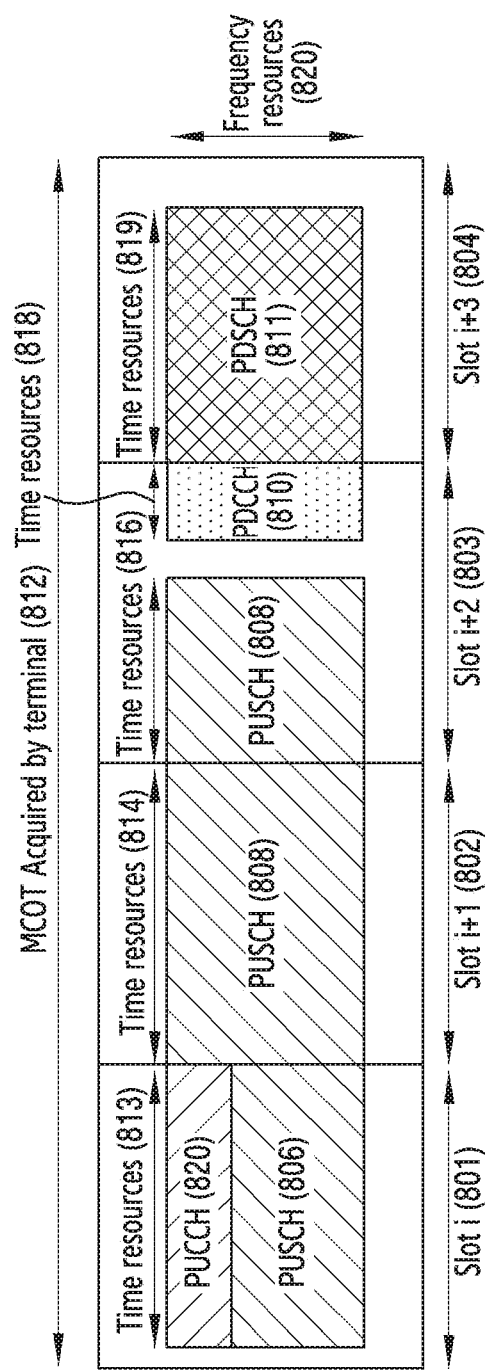
FIG. 8B illustrates a downlink or uplink scheduling method and a resource region in a wireless communication system according to an embodiment of the disclosure.

FIG. 8B illustrates a downlink or uplink scheduling method and a resource region in a wireless communication system according to an embodiment of the disclosure. Specifically, FIGS. 8A and 8B illustrate the case in which an uplink signal is transmitted without uplink scheduling information in an unlicensed band.

Referring to FIGS. 8A and 8B, a channel access procedure is performed in the unlicensed band to transmit an uplink signal without uplink scheduling information. When the terminal performs a channel access procedure during a variable time and accesses the unlicensed band, the terminal may schedule downlink transmission in the last slot 804 or the last subframe 804 of slots 801 to 804 within a maximum channel occupancy time 812 through a channel occupancy time sharing indicator of uplink control information 805. The BS performs a channel access procedure during a fixed time and determines channel access, and the terminal configures one last symbol of a slot 808 or a subframe 808 for uplink transmission as a gap interval that is emptied for the channel access procedure of the BS. Downlink transmission is limited to a PDCCH 810 as illustrated in FIG. 8B, and a start symbol of the PDCCH 810 is limited to a first symbol of the last slot 804 or the last subframe 804 and has a length of two symbols or smaller. Meanwhile, since downlink transmission time resource region information in the 5G communication system is determined through DCI, a transmission start time or symbol of the PDCCH 810 and a length and an end time or symbol of a PDSCH 811 may be variously configured as illustrated in FIGS. 8A and 8B. Accordingly, when the terminal shares the acquired maximum channel occupancy time, it is required to indicate time resource region information for downlink reception in uplink control information 820.

Figure 9A:
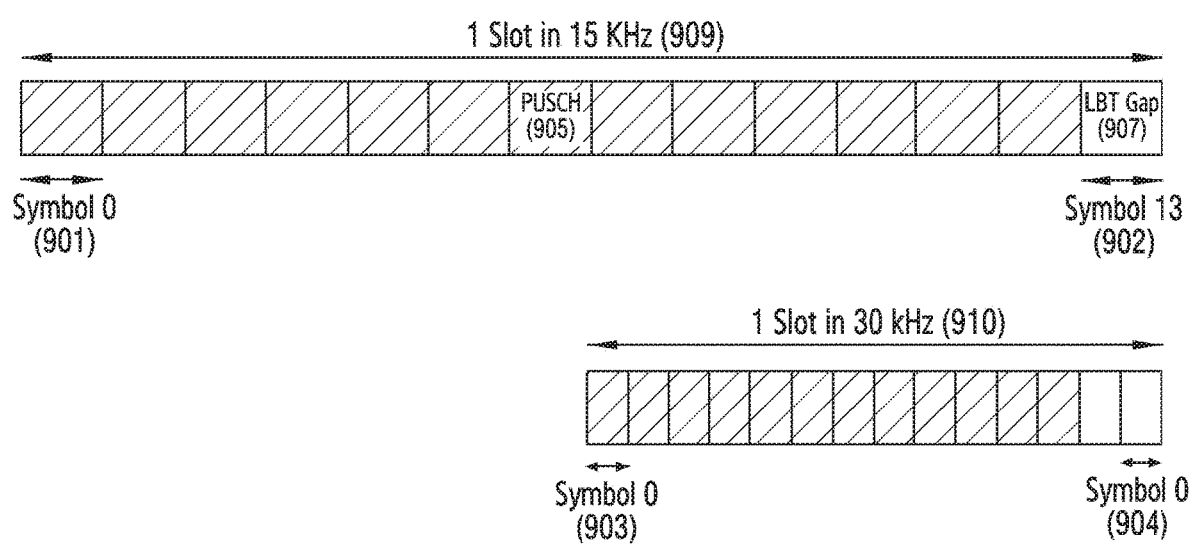
FIG. 9A illustrates a symbol length according to a plurality of subcarrier spacings in a wireless communication system according to an embodiment of the disclosure.

FIG. 9A illustrates a symbol length according to a plurality of subcarrier spacings in a wireless communication system according to an embodiment of the disclosure.

Figure 9B:
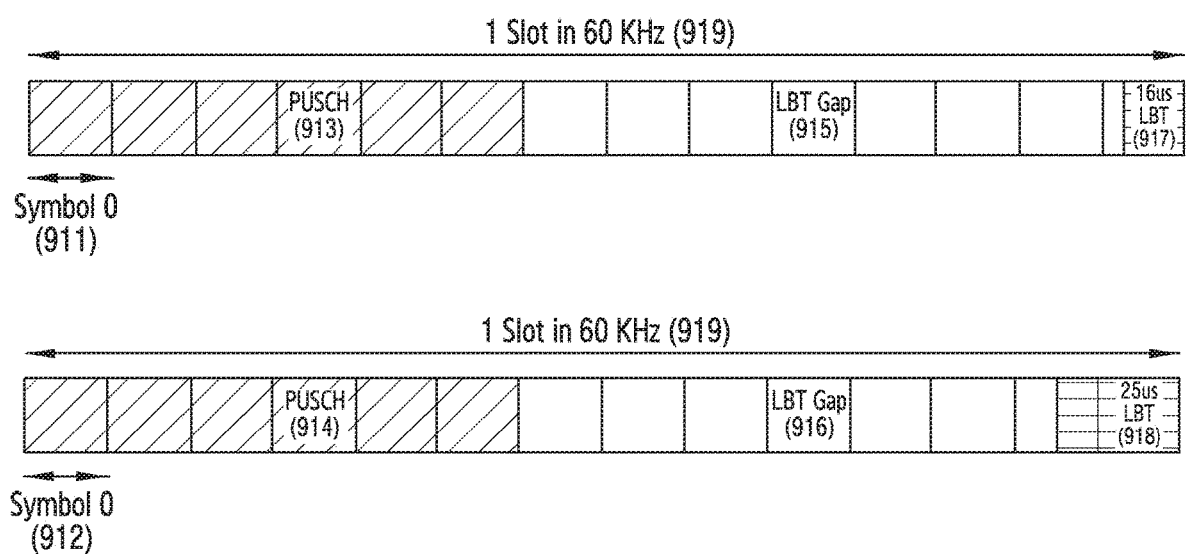
FIG. 9B illustrates a symbol length according to a plurality of subcarrier spacings in a wireless communication system according to an embodiment of the disclosure.

FIG. 9B illustrates a symbol length according to a plurality of subcarrier spacings in a wireless communication system according to an embodiment of the disclosure.

As a plurality of subcarrier spacings are supported in the 5G communication system, a length of one symbol varies depending on the subcarrier spacing.

Referring to FIG. 9A, the length of one symbol 909 of 15 kHz may correspond to the length of two symbols of 30 kHz 910, and two symbols of 30 kHz may be configured as a gap interval.

Referring to FIG. 9B, when the BS performs a channel access procedure of a fixed time of 25 us 917 or 16 us 918 for downlink transmission, uplink resources are wasted if one symbol length 907 based on 15 kHz is configured as the gap interval. Accordingly, when configuring the gap interval for the channel access procedure of the BS, it is required to change the gap interval according to a channel access procedure type and used subcarrier spacing in order to prevent uplink resource loss.

Therefore, when the terminal transmits an uplink signal without uplink scheduling information, a method by which the BS and the terminal configured to receive or transmit the PDSCH or the PUSCH (e.g., PUSCH 905, 913, 914) in the unlicensed band performs PDCCH, PDSCH, or PUSCH transmission and reception within the maximum channel occupancy interval acquired by the terminal. More specifically, the disclosure proposes an apparatus and a method by which the terminal or the BS determines (or changes or controls) time resources through which the PDCCH, the PDSCH, or the PUSCH can be transmitted within the maximum channel occupancy interval.

Figure 10:
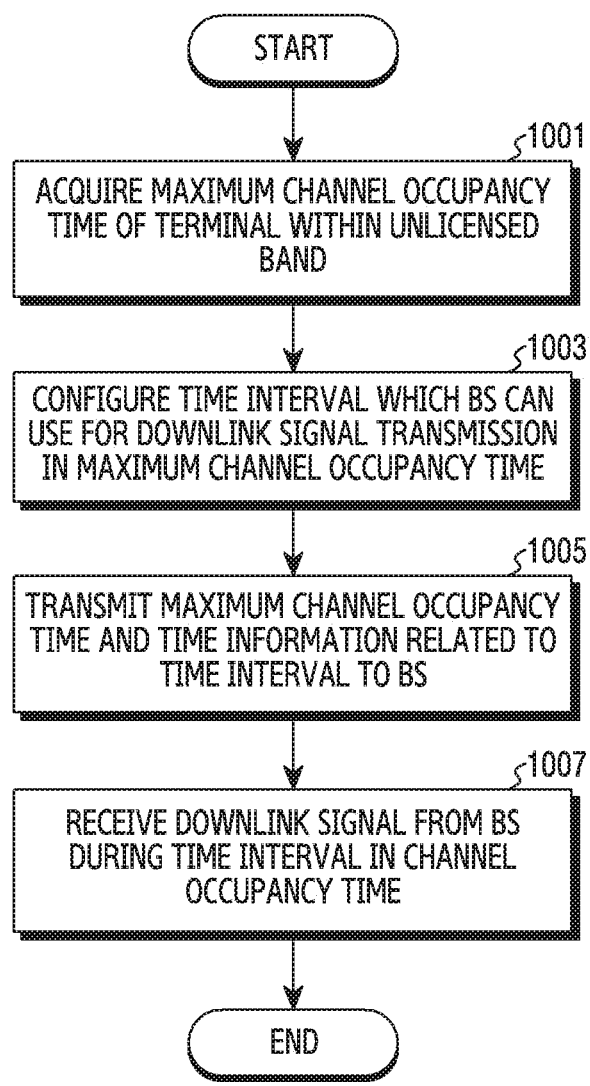
FIG. 10 is a flowchart illustrating the operation of the terminal in a wireless communication system according to an embodiment of the disclosure.

FIG. 10 is a flowchart illustrating the operation of the terminal in a wireless communication system according to an embodiment of the disclosure. FIG. 10 illustrates an operation method of the terminal 120.

Referring to FIG. 10, the terminal acquires a Maximum Channel Occupancy Time (MCOT) of the terminal within an unlicensed band in operation 1001. To this end, the terminal may identify whether a channel is occupied, and then when the channel is not occupied, determine to transmit a signal. After performing LBT, the terminal may occupy the channel. For example, the terminal may transmit the signal in the unlicensed band according to a grant-free type.

In operation 1003, the terminal configures a time interval which the BS can use for downlink signal transmission in the maximum channel occupancy time. According to various embodiments of the disclosure, the terminal may share a portion of the maximum channel occupancy time acquired after the channel access procedure with the BS so that the BS may use the same for downlink signal transmission. The terminal may configure time resources of the PDCCH, the PDSCH, or the PUSCH in the maximum channel occupancy time.

In operation 1005, the terminal transmits time information related to the maximum channel occupancy time and the time interval to the BS. According to various embodiments of the disclosure, the time information may include information on at least one of a time point at which the BS initiates a downlink signal or a length of a time during which the BS can transmit a downlink signal. The time information may further include information on a gap interval for channel access of the BS before the time point at which the BS initiates the downlink signal. The gap interval may be differently configured according to subcarrier spacing configured in the terminal. Further, the gap interval may be configured to have the same time length regardless of subcarrier spacing. According to various embodiments of the disclosure, the time information may be generated on the basis of at least one piece of scheduling information and slot structure information. The scheduling information may be transferred from the BS to the terminal through Downlink Control Information (DCI). Further, the slot structure information may be received by the terminal from a node which accesses the unlicensed band.

In operation 1007, the terminal receives a downlink signal from the BS during the time interval of the maximum channel occupancy time. According to various embodiments of the disclosure, the terminal and the BS may transmit and receive the PDCCH, the PDSCH, or the PUSCH during the time interval of the maximum channel occupancy time.

Figure 11:
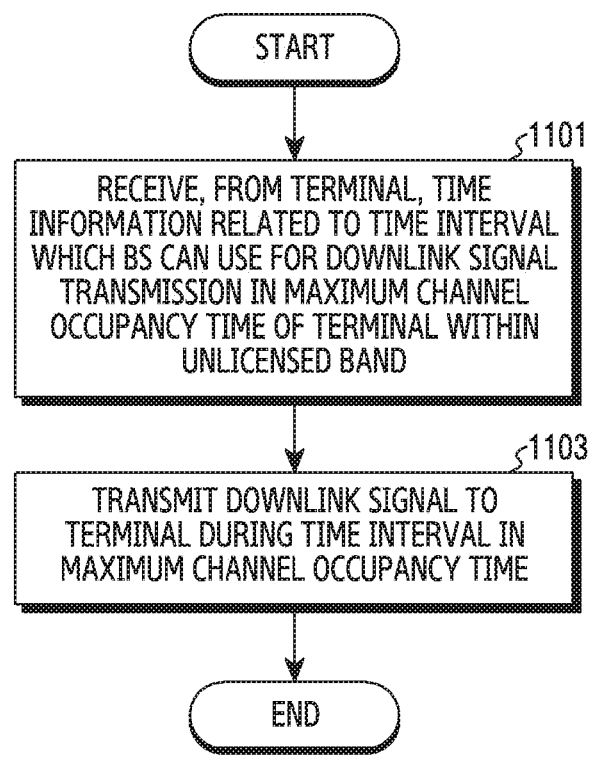
FIG. 11 is a flowchart illustrating the operation of the BS in a wireless communication system according to an embodiment of the disclosure.

FIG. 11 is a flowchart illustrating the operation of the BS according to an embodiment of the disclosure.

Referring to FIG. 11, in operation 1101, the BS receives, from the terminal, time information related to a maximum occupancy interval of the terminal within the unlicensed band and a time interval which the BS can use for downlink signal transmission in the maximum occupancy interval. According to various embodiments of the disclosure, the BS and the terminal transmitting and receiving a signal in the unlicensed band assume a terminal configured to transmit the PUCCH/PUSCH in a plurality of slots through a grant-free configuration. The terminal may share a portion of the maximum channel occupancy time acquired after the channel access procedure with the BS so that the BS may use the same for downlink signal transmission. The channel access procedure of the terminal may be performed by performing the channel access procedure during a variable time and then transmitting an uplink or downlink signal. According to various embodiments of the disclosure, the terminal may configure time resources of the PDCCH, the PDSCH, or the PUSCH in the maximum channel occupancy time.

According to various embodiments of the disclosure, the time information may include information on at least one of a time point at which the BS initiates a downlink signal or a length of a time during which the BS can transmit a downlink signal. The time information may further include information on a gap interval for channel access of the BS before the time point at which the BS initiates the downlink signal. The gap interval may be differently configured according to subcarrier spacing configured in the terminal. The gap interval may be configured to have the same time length regardless of subcarrier spacing. According to various embodiments of the disclosure, the time information may be generated on the basis of at least one of scheduling information and slot structure information. The scheduling information may be transferred from the BS to the terminal through Downlink Control Information (DCI). The slot structure information may be received by the terminal from a node which accesses the unlicensed band.

In operation 1103, the BS transmits a downlink signal to the terminal during the time interval of the maximum occupancy interval. According to various embodiments of the disclosure, the terminal and the BS may transmit and receive the PDCCH, the PDSCH, or the PUSCH during the time interval of the maximum channel occupancy time.

Hereinafter, the apparatus and the method proposed by embodiments of the disclosure are not limited to each of the embodiments but a combination of all or some of one or more embodiments proposed by the disclosure may be used for an apparatus and a method for configuring or determining time resources of the PDCCH, the PDSCH, or the PUSCH. An embodiment of the disclosure is described on the basis of the case in which the terminal receives configuration of PUCCH or PUSCH transmission from the BS through higher layer signal configuration without DCI reception like Semi-Persistent Scheduling (SPS) or grant-free transmission but may be applied to the case in which the terminal receives configuration of scheduling of PUCCH or the PUSCH transmission and reception from the BS through DCI. Further, the embodiment of the disclosure is described on the assumption that the BS and the terminal operate in the unlicensed band, but the apparatus and the method proposed by embodiments of the disclosure may be applied to the BS and the terminal operating in the licensed band or a shared band (shared spectrum) as well as the unlicensed band.

Hereinafter, the apparatus and the method proposed by embodiments of the disclosure are not limited to each of the embodiments, but a combination of some or all of one or more embodiments proposed by the disclosure may be used for an apparatus and a method for configuring or determining time-frequency resources of the PDSCH or the PUSCH. An embodiment of the disclosure is described on the basis of the case in which the terminal receives configuration of PUSCH transmission from the BS through higher layer signal configuration without DCI reception like Semi-Persistent Scheduling (SPS) or grant-free transmission but may be applied to the case in which the terminal receives configuration of scheduling of PDSCH reception or PUSCH transmission from the BS through DCI. Further, the embodiment of the disclosure is described on the assumption that the BS and the terminal operate in the unlicensed band, but the apparatus and the method proposed by embodiments of the disclosure may be applied to the BS and the terminal operating in the licensed band or a shared band (shared spectrum) as well as the unlicensed band.

A method of determining an uplink/downlink resource region will be described on the basis of the assumption that subcarrier spacing is based on uplink transmission/reception configuration, but the uplink/downlink resource region can be determined on the basis of subcarrier spacing information using downlink transmission/reception configuration.

Embodiment 1

Embodiment 1 proposes a method by which the BS and the terminal operating in the unlicensed band determine a PUCCH/PUSCH resource region of the terminal. Particularly, a method of configuring a gap interval to empty some intervals of uplink transmission for the channel access procedure of the BS is proposed.

Figure 12:
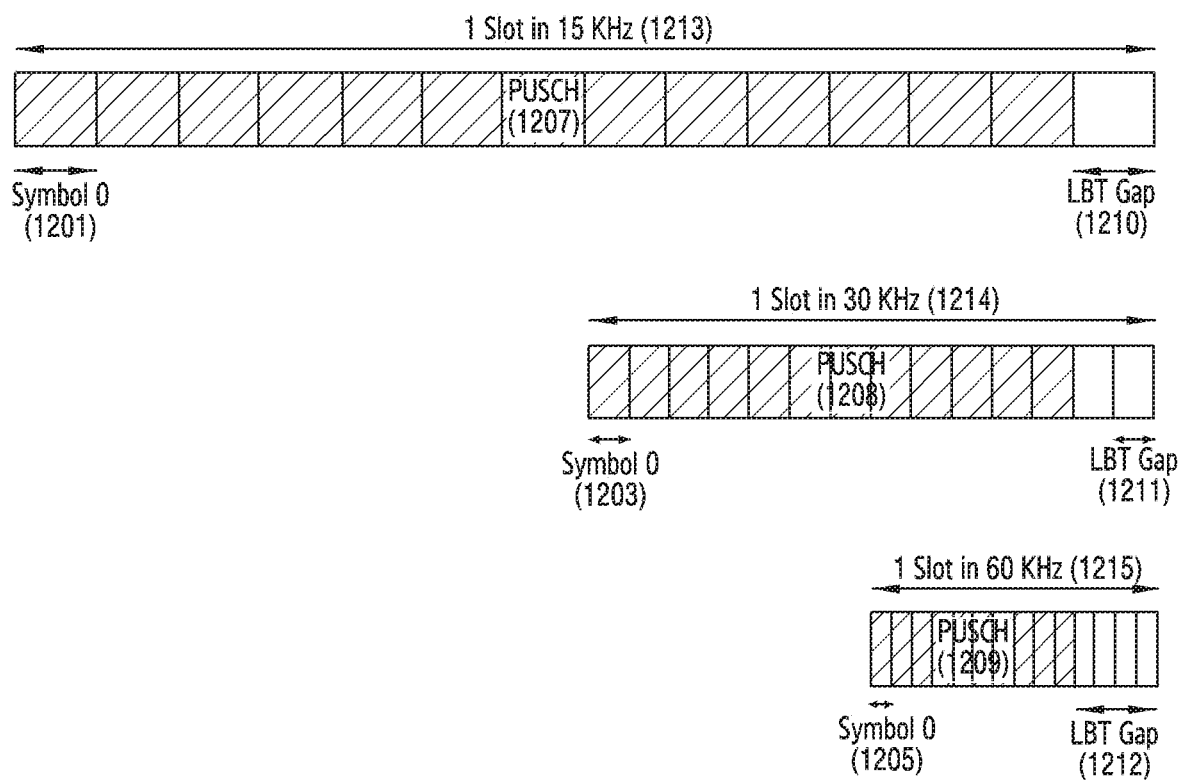
FIG. 12 illustrates a method of allocating resources in a wireless communication system according to an embodiment of the disclosure.

FIG. 12 illustrates a method of allocating resources in a wireless communication system according to an embodiment of the disclosure.

Referring to FIG. 12, the operation of Embodiment 1 is described below.

The BS and the terminal transmitting and receiving a signal in the unlicensed band assume a terminal configured to transmit the PUCCH/PUSCH in a plurality of slots through a grant-free configuration. The terminal may share a portion of the maximum channel occupancy time acquired after the channel access procedure (e.g., type 1 channel access procedure) with the BS so that the BS may use the same for downlink signal transmission. The terminal may transmit time information which the BS can use for downlink signal transmission (e.g., information on a time at which the BS initiates a downlink signal and a time at which the BS can transmit a downlink signal) to the BS using uplink control information (e.g. PUSCH 1207, 1208, 1209). The terminal may generate or provide gap intervals 1210, 1211, and 1212 for performing the channel access procedure of the BS before the time point at which a downlink signal is initiated. The gap intervals may be predefined between the BS and the terminal or may be configured in the terminal by the BS through higher layer signaling. The terminal may receive indication of the gap intervals from the BS through UL grant indicating grant-free transmission activation. In another method, the terminal may inform the BS of the gap intervals through a transmitted uplink control signal including a downlink signal initiation time of the BS. The method is described below in more detail.

Method 2: Method of Configuring the Same Gap Interval According to Subcarrier Spacing.

Method 2 is a method of determining a gap interval through subcarrier spacing scheduled or configured in the terminal. In other words, the terminal may determine the gap interval as X symbols in consideration of the symbol length varying depending on subcarrier spacing. Through method 2, the length of the gap interval may be maintained to be the same regardless of subcarrier spacing. Specifically, the BS and the terminal may reflect the symbol length varying depending on subcarrier spacing to determine the gap interval as X symbols based on the assumption that one symbol is empty on the basis of the smallest subcarrier spacing. For example, when the smallest subcarrier spacing is 15 kHz (1213), the symbol length is ½ of 15 kHz in the case of subcarrier spacing of 30 kHz (1214), so the terminal transmitting an uplink signal using the subcarrier spacing of 30 kHz may determine that two symbols 1211 are the gap interval and empty the same. Similarly, in the case of 60 kHz (1215), four symbols 1212 may be configured as the gap interval.

The terminal or the BS may determine the gap interval according to subcarrier spacing through 1-bit signaling in Table 6 below. The gap interval may be determined through other fields in addition to signaling in Table 6. For example, when the terminal allows or indicates downlink signal transmission (UL-to-DL sharing) of the BS, X symbols may be determined as the gap interval without 1 bit in Table 6. When the terminal does not allow or indicate downlink signal transmission (UL-to-DL sharing) of the BS, there is no gap interval. Method 2 has an advantage in that the gap interval can be configured through simple signaling regardless of a channel access procedure type.

TABLE 6

| 1 LBT gap indication |
| --- |
| 0: last X symbol(s) <br> 1: No gap |

Embodiment 2

The Embodiment 2 proposes a method by which the BS and the terminal operating in the unlicensed band determine a PUCCH/PUSCH resource region of the terminal. Particularly, a method of configuring a gap interval to empty some intervals of uplink transmission for the channel access procedure of the BS differently according to subcarrier spacing is proposed.

Figure 13:
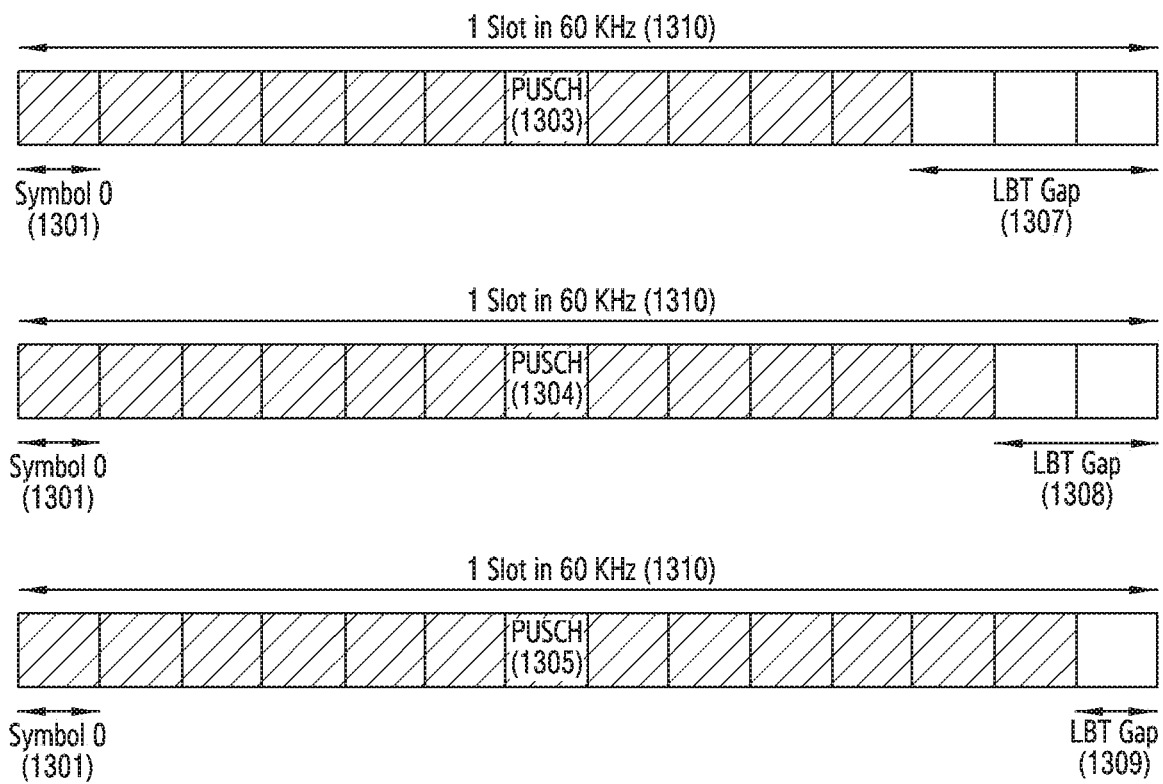
FIG. 13 illustrates a method of allocating resources in a wireless communication system according to an embodiment of the disclosure.

FIG. 13 illustrates a method of allocating resources in a wireless communication system according to an embodiment of the disclosure.

Referring to FIG. 13, the operation of the Embodiment 1 is described below.

The BS and the terminal transmitting and receiving a signal in the unlicensed band assume a terminal configured to transmit the PUCCH/PUSCH (e.g., PUSCH 1303, 1304, 1305) in a plurality of slots (e.g., slots 1310) through a grant-free configuration. The terminal may share a portion of the maximum channel occupancy time acquired after the channel access procedure (e.g., type 1 channel access procedure) with the BS so that the BS may use the same for downlink signal transmission. The terminal may transmit time information which the BS can use for downlink signal transmission (e.g., information on a time at which the BS initiates a downlink signal and a time at which the BS can transmit a downlink signal) to the BS using uplink control information. The terminal may generate or provide gap intervals 1307, 1308, and 1309 for performing the channel access procedure of the BS before the time point at which a downlink signal is initiated. The gap intervals may be predefined between the BS and the terminal or may be configured in the terminal by the BS through higher layer signaling. The terminal may receive indication of the gap intervals from the BS through UL grant indicating grant-free transmission activation. In another method, the terminal may inform the BS of the gap intervals through a transmitted uplink control signal including a downlink signal initiation time of the BS. The method is described below in more detail.

Another method by which the terminal determines a gap interval to empty some intervals of uplink transmission for the channel access procedure of the BS is described below.

Method 3: Method of Configuring the Last X Symbols as the Gap Interval in the Last Slot Scheduled or Configured for Uplink Transmission Method 3 is described below with reference to FIG. 13. For example, the last X symbols 1307, 1308, and 1309 of the last slots for uplink transmission of the terminal using subcarrier spacing of 60 kHz are configured as gap intervals for the channel access procedure to be performed by the BS. More specifically, when the BS performs the channel access procedure during the aforementioned variable time, the terminal configures the last three symbols 1307 as the gap interval. When the BS performs the channel access procedure during a fixed time, the terminal may configure the last two symbols 1308 or the last one symbol 1309 as the gap interval according to the type of the channel access procedure. X symbols may be defined differently according to subcarrier spacing as shown in Table 7 below. Method 3 has an advantage in that the waste of uplink resources can be reduced through configuration of the gap interval according to the type of the channel access procedure of the BS.

TABLE 7

| LBT gap indication | | |
| --- | --- | --- |
| 15 kHz | 30 kHz | 60 kHz |
| 0: last symbol <br> 1: No gap | 00: last symbol <br> 01: last two symbol <br> 10: last X symbol <br> 11: No gap | 00: last symbol <br> 01: last two symbol <br> 01: last X symbol <br> 11: No gap |

Embodiment 3

The Embodiment 3 proposes a method by which the BS and the terminal operating in the unlicensed band determine a PUCCH/PUSCH resource region of the terminal. Particularly, a method of configuring a gap interval to empty some intervals of uplink transmission for the channel access procedure of the BS according to subcarrier spacing and a channel access procedure type is proposed.

Figure 14A:
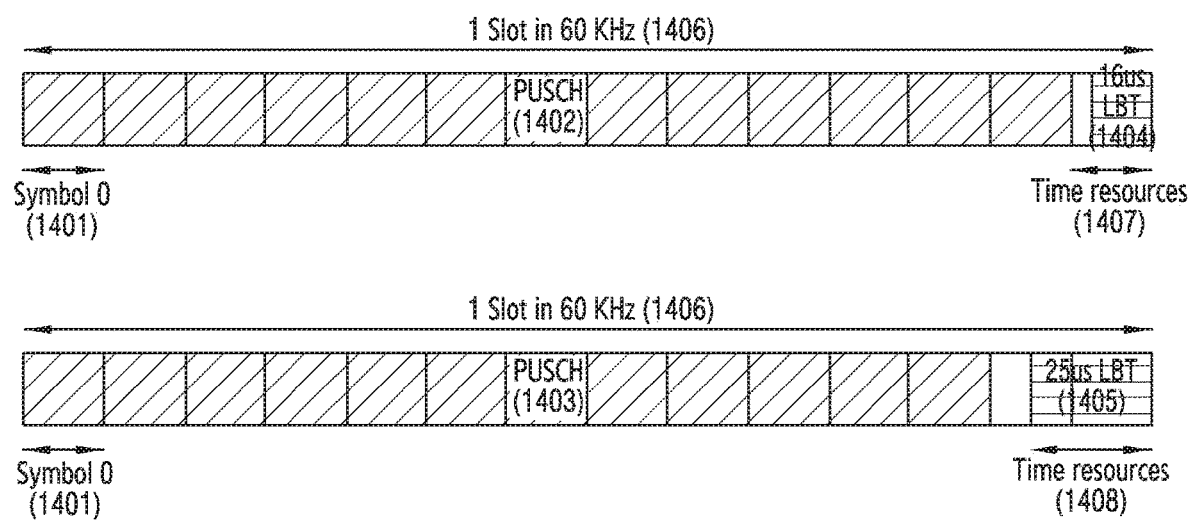
FIG. 14A illustrates a method of allocating resources in a wireless communication system according to an embodiment of the disclosure.

FIG. 14A illustrates a method of allocating resources in a wireless communication system according to an embodiment of the disclosure.

Figure 14B:
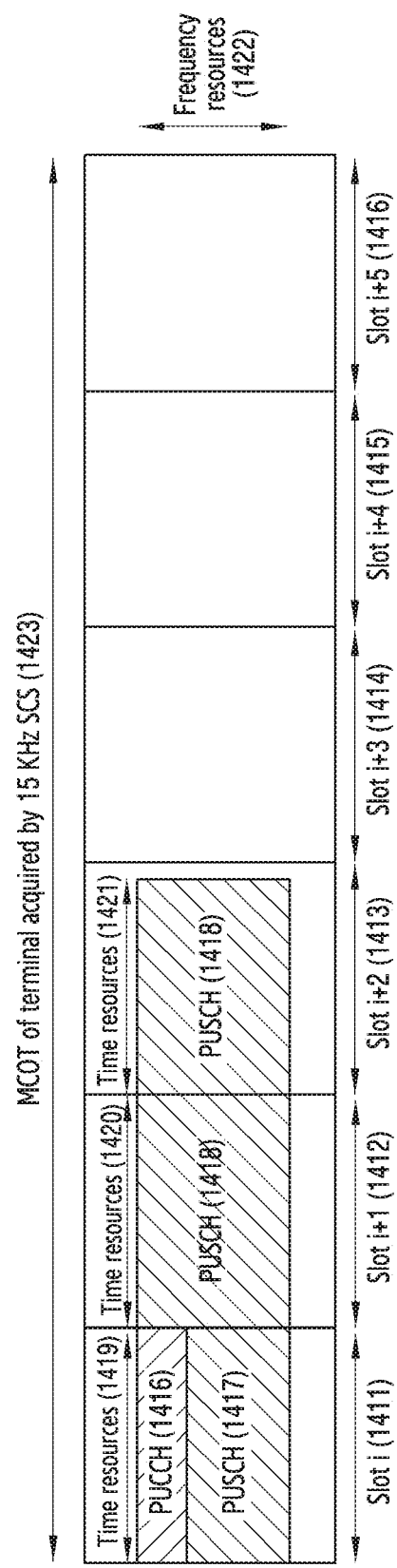
FIG. 14B illustrates a method of allocating resources in a wireless communication system according to an embodiment of the disclosure.

FIG. 14B illustrates a method of allocating resources in a wireless communication system according to an embodiment of the disclosure.

Figure 14C:
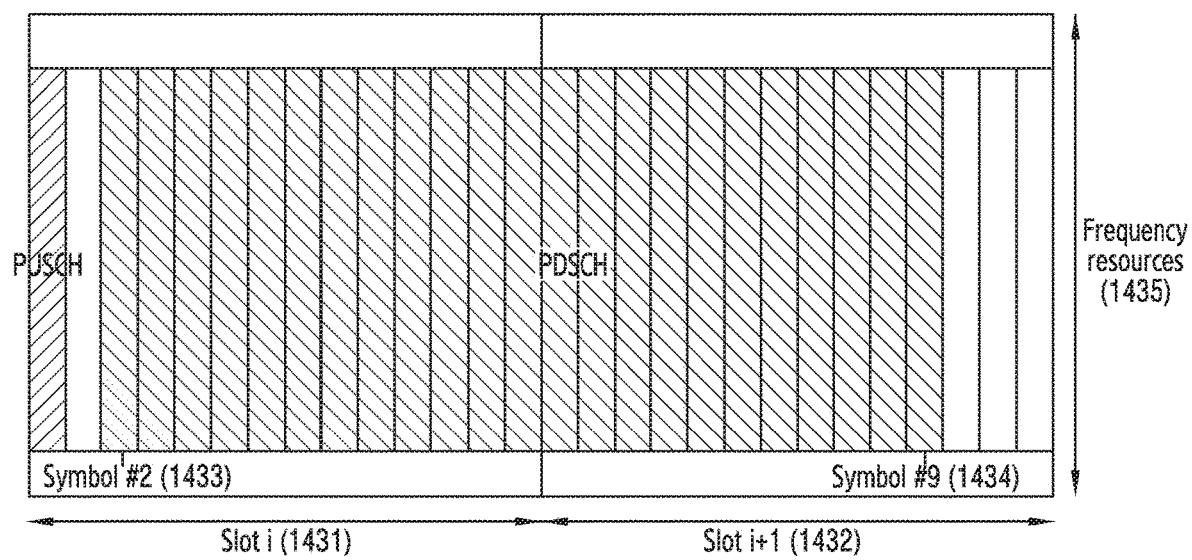
FIG. 14C illustrates a method of allocating resources in a wireless communication system according to an embodiment of the disclosure.

FIG. 14C illustrates a method of allocating resources in a wireless communication system according to an embodiment of the disclosure.

Figure 14D:
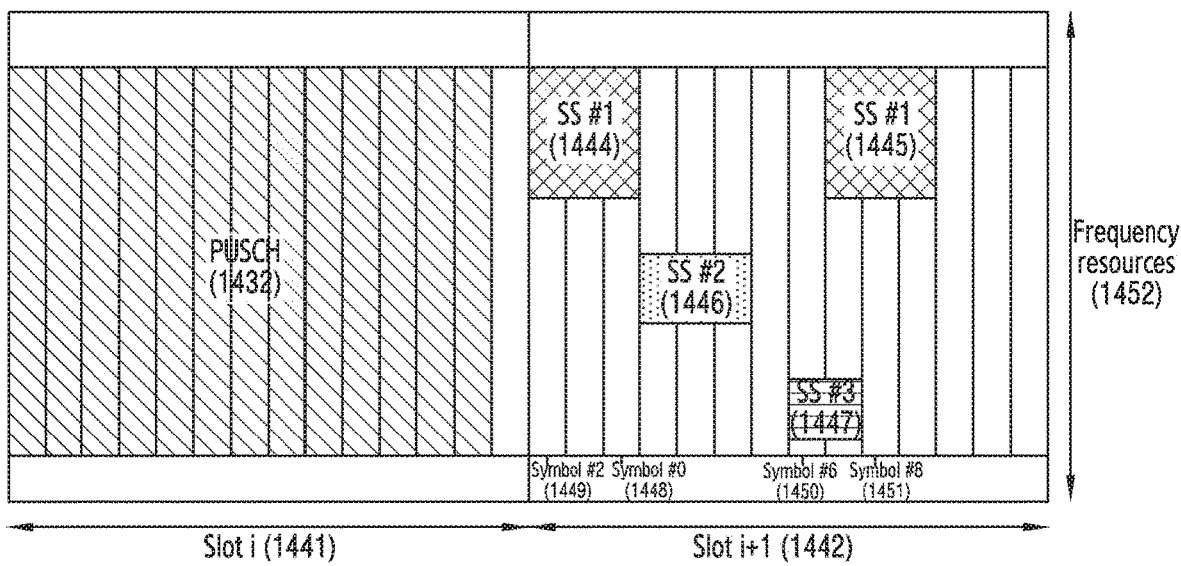
FIG. 14D illustrates a method of allocating resources in a wireless communication system according to an embodiment of the disclosure.

FIG. 14D illustrates a method of allocating resources in a wireless communication system according to an embodiments of the disclosure.

The operation of the Embodiment 3 is described below with reference to FIG. 14A.

Referring to FIG. 14A, the BS and the terminal transmitting and receiving a signal in the unlicensed band assume a terminal configured to transmit the PUCCH/PUSCH in a plurality of slots 1406 through a grant-free configuration. The terminal may share a portion of the maximum channel occupancy time acquired after the channel access procedure (e.g., type 1 channel access procedure) with the BS so that the BS may use the same for downlink signal transmission. The terminal may transmit time information which the BS can use for downlink signal transmission (e.g., information on a time at which the BS initiates a downlink signal and a time at which the BS can transmit a downlink signal) to the BS using uplink control information, such as PUSCH 1402, 1403. The terminal may generate or provide gap intervals 1407 and 1408 for performing the channel access procedure of the BS before the time point at which transmission of a downlink signal is initiated. The gap intervals may be predefined between the BS and the terminal or may be configured in the terminal by the BS through higher layer signaling. The terminal may receive indication of the gap intervals from the BS through UL grant indicating grant-free transmission activation. In another method, the terminal may inform the BS of the gap intervals through a transmitted uplink control signal including a downlink signal initiation time of the BS. The method is described below in more detail.

Another method by which the terminal determines a gap interval to empty some intervals of uplink transmission for the channel access procedure of the BS is described below.

Method 4: Method of Configuring a Gap Interval in Consideration of Subcarrier Spacing and a Channel Access Procedure Type of the BS Referring to FIG. 14A, method 4 is described below. For example, when subcarrier spacing of 60 kHz is used, a symbol length 1401 is 17.86 us. Accordingly, when the BS performs the channel access procedure during a fixed time of 16 us, a gap interval of one symbol is needed. On the other hand, when the BS performs the channel access procedure during a fixed time of 25 us, a gap interval of two symbols is needed. In other words, a minimum gap interval required to perform the channel access procedure of the BS or the number of symbols of the gap interval may be changed according to a channel access procedure type of the BS and subcarrier spacing used for used for uplink signal transmission of the terminal, which may be indicated by at least one method of Table 8 or Equation (1). When the channel access procedure during a variable time is needed like the second channel access procedure of type 2, it may be assumed that the gap interval of one symbol corresponding to subcarrier spacing of 15 kHz is needed.

TABLE 8

|        | 15 kHz   | 30 kHz   | 60 kHz   | 120 kHz  | 240 kHz   |
|--------|----------|----------|----------|----------|-----------|
| 16 us  | 1 symbol | 1 symbol | 1 symbol | 2 symbol | 3 symbol  |
| 25 us  | 1 symbol | 1 symbol | 2 symbol | 3 symbol | 6 symbol  |
| Type 1 | 1 symbol | 2 symbol | 4 symbol | 8 symbol | 16 symbol |

Minimum X symbols required according to the channel access type of the BS and subcarrier spacing may follow, for example, Equation (2) below.

$$\left\lceil \frac{LBT_{time}}{T_s} \right\rceil \text{ where } T_s = \frac{T_{sf}}{N_{symb}^{slot} \times 2^u} \qquad \text{Equation (2)}$$

In Equation (2), $T_{sf}$ denotes a subframe length corresponding to 1 ms, $N_{symb}^{slot}$ denotes the number of symbols included in one slot corresponding to 14, and u denotes a subcarrier spacing indicator, wherein u=0 in the case of subcarrier spacing of 15 kHz and u=1 in the case of subcarrier spacing of 30 kHz.

The terminal may indicate, to the BS, a channel access procedure type to be used by the BS using an uplink control signal (UCI) through bit information in Table 9. The BS performs the channel access procedure for downlink transmission according to the gap interval indicator in Table 9 received from the terminal. The BS may determine the number of symbols emptied for the gap interval in the last uplink signal transmission slot of the terminal according to the gap interval indicator. For example, when the terminal configured to perform uplink signal transmission with subcarrier spacing of 60 kHz indicates bits 10 corresponding to 25 us through the gap interval indicator in Table 9, the BS may determine that the gap interval of the terminal is 2 symbols through Table 8 or Equation (1) and correctly receive uplink data which the terminal transmits in the last uplink signal transmission slot according to the determined gap interval.

The terminal configures gap times 1404 and 1405 at least required for the channel access procedure of the BS according to the indicated channel access procedure type and configures gap intervals 1407 and 1408 for the channel access procedure of the BS as at least required X symbols on the basis of configured subcarrier spacing as shown in Equation (2). When the BS uses a portion of the channel occupancy interval acquired by the terminal for downlink transmission, if a channel access procedure for downlink signal transmission of the BS is predefined or is configured in or indicated to the terminal through a higher layer signal or a downlink control channel (e.g., DCI indicating grant-free transmission activation), the terminal may follow a channel access procedure type indicated by the BS. The terminal may indicate a gap interval indicator corresponding to the channel access procedure indicated by the BS or there may be no separate channel access procedure indicator. When the terminal can additionally indicate the channel access procedure of the BS in the above case, at least one bit of the indicator (e.g., 11 in Table 9) may be used to indicate the channel access procedure configured or indicated by the BS. Method 4 has an advantage in that an uplink gap interval for performing the channel access procedure of the BS in consideration of subcarrier spacing and the channel access procedure type of the BS is minimized and thus uplink transmission loss due to gap interval configuration is reduced.

TABLE 9

| LBT gap indication |
| --- |
| 00: no gap |
| 01: 16 us |
| 10: 25 us |
| 11: Type 1 (or follow gNB indication) |

Embodiment 4

The Embodiment 4 proposes a method by which the BS and the terminal operating in the unlicensed band configure a downlink transmission time resource region of the BS. Particularly, a method of configuring a slot in which downlink transmission is possible when downlink transmission of the BS is scheduled within a maximum channel occupancy interval acquired by the terminal is proposed.

More specifically, the BS and the terminal transmitting and receiving a signal in the unlicensed band assume a terminal configured to transmit the PUCCH/PUSCH in a plurality of slots through a grant-free configuration. The terminal may share a portion of the maximum channel occupancy time acquired after the channel access procedure with the BS so that the BS may use the same for downlink signal transmission. At this time, the terminal may transmit uplink control information including a downlink sharing indicator to the BS in X slots (or time) before a downlink sharing start slot. The BS may perform downlink resource transmission in a slot (or time) after X slots (or time) from a time point at which uplink control information indicating the downlink sharing indicator is transmitted. The X value may be indicated to the terminal by the BS through a higher layer signal or a control signal.

FIG. 14B illustrates a method of allocating resources in a wireless communication system according to an embodiment of the disclosure.

Referring to FIG. 14B, the operation of the Embodiment 4 is described. When the X value configured in the terminal is 3 and the downlink sharing indicator is transmitted to the BS in slot i 1411, the BS may determine that downlink transmission can start at slot i+3 1414. Hereinafter, various embodiments for configuring and determining the X value will be described in detail.

Embodiment 4-1

The BS may consider subcarrier spacing when configuring the X value in the terminal. More specifically, the terminal may determine the X value configured by the BS through a subcarrier spacing indicator u. For example, when the subcarrier spacing is 15 kHz (u=0), the terminal may determine a downlink sharing indicator transmission slot (or time) on the basis of the X value configured by the BS. When the subcarrier spacing is 30 kHz (u=1), the terminal may determine and transmit a downlink sharing indicator transmission slot (or time) on the basis of a value of X×2u. In another method, the terminal may determine the X value in units of time. For example, when X=3, the terminal may transmit the downlink sharing indicator to the BS before 3 ms of the downlink sharing start slot (or time).

Embodiment 4-2

The terminal may indicate the downlink sharing slot (or time) to the BS through uplink control information. More specifically, the terminal may transmit the downlink sharing indicator to the BS before X+Y slots to indicate a sharing start slot or indicate a sharing start slot indicator only through the Y value. The Y value is an additional slot indicator and may be transmitted using uplink control information. The additional slot indicator may include bit information in Table 10, and the bit information may be a slot or a time (e.g., ms). For example, when the X value configured in the terminal by the BS is 3, if the terminal transmits uplink control information including an additional slot indicator value 01 in slot i 1411, the terminal may transmit the downlink sharing indicator in slot i 1411, and the BS may perform downlink transmission after 4 (3+1) slots from the time point 1411 at which the terminal transmits the downlink sharing indicator. Further, the additional slot indicator may indicate one of one or more X values. For example, the BS may configure a plurality of X values in the terminal (X={2, 3, 4, 5}). The terminal may select one of the plurality of configured X values, determine the time point at which the downlink sharing indicator is transmitted, and inform the BS of the downlink sharing start slot (or time) through the additional slot indicator. The additional slot indicator may be included in uplink control information, and the BS may perform downlink transmission after a slot (or time) indicated by the additional slot indicator from the uplink control signal time point included in the additional slot indicator. The method has an advantage in that the terminal can transmit the downlink sharing indicator in another slot (or time) as well as the time point configured by the BS and thus increase a possibility of reception of the downlink sharing indicator by the BS.

TABLE 10

| Additional slot indicator | Information |
| --- | --- |
| 00 | 0 or X = 2 |
| 01 | 1 or X = 3 |
| 10 | 2 or X = 4 |
| 11 | 3 or X = 5 |

Embodiment 4-3

The terminal may transmit the downlink transmission indicator before X slots (or time) configured by the BS, and the BS may perform downlink resource transmission after the X slots (or time) from the time point at which the downlink transmission indicator is transmitted. At this time, the terminal may indicate sharing of downlink resources for multiple slots through multi-slot sharing indicators, and the multi-slot sharing indicator may be as shown in Table 11. For example, when the terminal transmits the downlink sharing indicator to the BS in slot i 1411 and the X value configured by the BS is 3, if the terminal indicates sharing of two slots through the multi-slot indicator, the BS may perform downlink transmission in slot i+3 1414 and slot i+4 1415. In another method, the BS may indicate the downlink slot (or time) to be shared through a higher layer signal or a downlink control channel to the BS. For example, when the BS configures the downlink sharing time as 1 ms and indicates the same to the terminal, the terminal may configure 1 slot as downlink resources of the BS in 15 kHz and configure 2 slots as downlink resources of the BS in 30 kHz when transmitting the downlink sharing indicator.

TABLE 11

| Multi-slot indicator | Information |
| --- | --- |
| 00 (or default) | 1 slot (or time) sharing |
| 01 | 2 slots (or time) sharing |
| 10 | 3 slots (or time) sharing |
| 11 | 4 slots (or time) sharing |

The terminal may indicate downlink transmission of the BS for a slot configured by a configured grant located outside the maximum channel occupancy interval acquired by the terminal. For example, when the downlink sharing indicator is not included in uplink control information, when the downlink sharing indicator indicates non-sharing, or when the BS can determine the maximum channel occupancy interval through a separate indicator indicating a maximum channel occupancy state, the BS may determine that a downlink transmission time resource region configured by the terminal is applied outside the maximum channel occupancy interval acquired by the terminal.

Embodiment 5

In Embodiment 5, the BS and the terminal operating in the unlicensed band propose a method by which the BS determines a downlink transmission time resource region. Particularly, a method of configuring and determining a start symbol and length of downlink time resources when scheduling downlink transmission of the BS within a maximum channel occupancy interval acquired by the terminal is proposed.

More specifically, the BS and the terminal transmitting and receiving a signal in the unlicensed band assume a terminal configured to transmit the PUCCH/PUSCH in a plurality of slots through a configured grant or a grant-free configuration. The terminal may share a portion of the maximum channel occupancy time acquired after the channel access procedure with the BS so that the BS may use the same for downlink signal transmission. At this time, downlink transmission time resource region information of the BS may be indicated by a combination of a downlink transmission start symbol (or time) and a downlink transmission length, an end time or symbol and included in uplink control information as one field or value. The BS may determine a downlink transmission time resource region in which downlink transmission is performed through the field or value indicating the downlink transmission time resource region included in the received uplink control information. For example, when the terminal transmits uplink control information including the field or value indicating a combination of downlink transmission start symbol 2 and transmission length 10, the BS may determine the downlink transmission start symbol and the transmission length on the basis of the received field or value. Thereafter, the BS may start downlink transmission at the downlink transmission start symbol configured by the terminal in the downlink slot configured by the terminal and end the downlink transmission after the downlink transmission length. The following description is limited to the downlink transmission start symbol and the transmission length for convenience of description, a detailed embodiment for configuring and determining the combination of the downlink transmission start symbol and the transmission length will be described.

Embodiment 5-1

The BS may configure the field or value indicating at least one combination of the downlink transmission start symbol and the transmission length in the terminal through a higher layer signal. At this time, the BS may configure a separate combination of the downlink transmission start symbol and the transmission length used for configuring downlink transmission time resources to be shared by the terminal and configure the field or value of the combination in the terminal. For example, when only a control channel can be transmitted in downlink resources shared by the terminal, the BS may configure at least one combination of the downlink transmission start symbol and the transmission length as the PDCCH transmission symbol length, for example, 1, 2, or 3, and then configure the field or value of the combination in the terminal. After selecting one of the combinations of the downlink transmission start symbol and the transmission length configured by the BS, the terminal may transmit uplink control information including the field or value of the combination to the BS. The BS may perform downlink transmission through the received combination of the downlink start symbol and the transmission length.

Embodiment 5-2

The BS may configure at least one combination of the downlink transmission start symbol and the transmission length in the terminal through a higher layer signal. When the terminal or the BS indicates sharing of downlink resources for one or more slots, that is, multiple slots, the BS and the terminal may determine the combination of the downlink transmission start symbol and the transmission length in consideration of multi-slot transmission information. In other words, when the BS can perform downlink transmission in multiple slots, the downlink transmission length may be an end time point of the downlink transmission slot.

FIG. 14C illustrates a method of allocating resources in a wireless communication system according to an embodiment of the disclosure.

Referring to FIG. 14C, in description of Embodiment 5-2, the terminal may indicate a combination of downlink transmission start symbol 2 and transmission length 10 among combinations of the downlink transmission start symbol and the transmission length configured by the BS through downlink transmission time resources to be shared to the BS. At this time, if the terminal configures downlink transmission resources for two slots 1431 and 1432, the BS may perform downlink transmission from symbol #2 1433 of a first slot 1431 for downlink transmission and end the downlink transmission at symbol #9 1434 of a second slot 1432.

Embodiment 5-3

The BS may configure multi-slot transmission information and at least one combination of the downlink transmission start symbol and the transmission length in the terminal through a higher layer signal. The terminal may select one of the combinations configured as shown in Table 12 and inform the BS of downlink transmission time resources to be shared. For example, when the terminal transmits uplink control information including field 3 in Table 12, the BS may perform downlink transmission in three slots and may start the downlink transmission at a second symbol in the first slot and end the downlink transmission at a tenth symbol in the third slot.

TABLE 12

| Field or value | Number of transmission slots | Start symbol | Length (or end symbol) |
|---|---|---|---|
| 1 | 1 | 2 | 10 |
| 2 | 1 | 2 | 8 |
| 3 | 3 | 2 | 10 |
| 4 | 3 | 2 | 8 |

Embodiment 6

In embodiment 6, the BS and the terminal operating in the unlicensed band propose a method by which the BS determines a downlink transmission time resource region. Particularly, when downlink transmission of the BS is scheduled within a maximum channel occupancy interval acquired by the terminal, a method of configuring and determining a start symbol and a length of downlink time resources on the basis of downlink control channel region configuration information, that is, information on a CORESET or a search space set is proposed.

The BS and the terminal transmitting and receiving a signal in the unlicensed band assume a terminal configured to transmit the PUCCH/PUSCH in a plurality of slots through a configured grant or a grant-free configuration. The terminal may share a portion of the maximum channel occupancy time acquired after the channel access procedure with the BS so that the BS may use the same for downlink signal transmission. The terminal may receive a downlink control channel only in a slot or a symbol in which the BS configures a control channel region through a higher layer signal or monitor the PDCCH. In other words, when there is no control channel region configuration in the indicated slot or symbol even though the terminal indicates downlink sharing to the BS, the terminal may receive a downlink signal. Accordingly, the location at which the terminal can indicate a downlink transmission time start symbol may be limited to the control channel region configuration, and the terminal may inform the BS of the location of the start symbol of the downlink transmission time region, to be shared, through the control channel region configuration. Hereinafter, a detailed embodiment of a method by which the terminal indicates a downlink transmission time resource region of the BS using control channel region configuration information will be described.

Embodiment 6-1

The terminal may transmit uplink control information including a search space set index in order to indicate a downlink transmission time resource region of the BS.

FIG. 14D illustrates a method of allocating resources in a wireless communication system according to an embodiment of the disclosure.

Referring to FIG. 14D, embodiment 6-1 is described below. In FIG. 14D, when the terminal configures a downlink transmission time resource region of the BS in slot i+1 1442, available downlink transmission start locations may be first symbols 1448, 1449, 1450, and 1451 of respective control channel regions 1444, 1445, 1446, and 1447 configured in slot i+1 1442. The PUSCH 1432 may be transmitted in slot i 1441. Accordingly, the terminal may transmit uplink control information including one of a plurality of search space set indexes configured to indicate the downlink transmission time resource region to the BS. The BS may determine a downlink transmission time resource region using control channel region configuration information of the received search space set index. For example, in FIG. 14D, when the terminal transmits search space set #2 1446 to the BS, the BS may determine that downlink transmission can start at a second symbol 1449 of slot i+1 1442. The transmission length of the downlink transmission resource region may follow the CORESET configuration including the search space set. For example, search space set #3 1446 may be related to a CORESET index of the control region interval configured as two symbols. Accordingly, the terminal indicates search space set #3 1446 to the BS, the BS may determine that downlink transmission can be performed during two symbols from a sixth symbol 1450 of slot i+1 1442.

Embodiment 6-2

In order to indicate the downlink transmission time resource region of the BS, the terminal may transmit uplink control information including the CORESET index. The BS may determine the downlink transmission time resource region on the basis of control channel region configuration information of the CORESET index received from the terminal. For example, when the terminal transmits an uplink control channel with a CORESET index including search space set #3 1447, the BS may determine that downlink transmission can be performed during two symbols from symbol #6 1450. If the number of search space sets included in one CORESET index is plural, the terminal may configure a separate index by arranging search space set indexes in ascending or descending order from the lowest search space set index or the highest search space set index included in the CORESET index and then transmit the configured separate index to the BS through an uplink control channel. The BS may determine the downlink transmission time resource region through control channel region configuration information configured in the search space set index connected to the configured separate index.

Embodiment 6-3

When configuring a control channel region, the BS may configure a control channel reception time point or a PDCCH monitoring time point one or more times within one slot. For example, search space set #1 1445 may be configured such that the terminal monitors the PDCCH in symbol #0 1448 and symbol #8 1445. Accordingly, when the terminal has a plurality of PDCCH monitoring time points (or symbols), there is a need of a method by which the terminal selects one PDCCH monitoring time point (or symbol) from the plurality of PDCCH monitoring time points (or symbols) and indicates the selected PDCCH monitoring time point as the downlink transmission start symbol to the BS. To this end, the terminal may configure a separate sequence index by arranging the plurality of PDCCH monitoring time points (or symbols) in ascending order from the lowest symbol index and transmit the separate sequence index to the BS. For example, a first PDCCH monitoring time point (or symbol) 1444 of search space set #1 is a first search space set sequence index, and a second PDCCH monitoring time point (or symbol) 1445 of search space set #1 is a second search space set sequence index. If the terminal indicates the second search space set sequence index to the BS, the BS may determine that downlink transmission can be performed during three symbols from an eighth symbol 1451 in slot i+1 1442.

In another method, the terminal may transmit an uplink transmission end symbol to the BS. When the terminal transmits the CORESET or search space set index in order to indicate the downlink transmission time region of the BS, the terminal may also transmit an uplink transmission end symbol within the corresponding slot and thus inform the BS of the available PDCCH monitoring time point. For example, when the terminal indicates symbol #6 1450 as the uplink end symbol in slot i+1 1442 and indicates search space set #1 to the BS for downlink transmission resource region allocation, the BS may determine that downlink transmission can be performed during three symbols from an eighth symbol 1451 of slot i+1 1442.

Embodiment 6-4

When a portion of the maximum channel occupancy interval acquired by the terminal is shared with the BS as downlink transmission resources, the BS and the terminal may configure at least one piece or a plurality of pieces of separate control channel region information for allocation of downlink transmission resources of the terminal. For example, the BS may configure CORESET #X and search space set #Y as control channel region information used for BS downlink transmissions resource allocation of the terminal. Parameters of CORESET #X and search space set #Y which may include the CORESET interval, the number of PDCCH candidates at aggregation level L, monitoring occasion in units of symbols within the slot for the search space, the search space type, a combination of a DCI format and an RNTI to be monitored in the corresponding search space may be configured by the BS in the terminal within a range that does not exceed the number of PDCCH candidates to be monitored per slot through higher layer signaling. For example, when the BS configures the interval of CORESET #X as 2 and the monitoring occasion in units of symbols within the slot for search space set #Y as symbol #6, the terminal may indicate CORESET #X or corresponding search space set #Y to the BS and configure a downlink transmission time resource region, and the BS may perform downlink transmission during two symbols from symbol #6 of the slot to be shared. The terminal may transmit a sharing indicator and a CORESET or search space set index together and indicate downlink sharing and the downlink time resource region of the BS. In another method, the terminal may transmit only the sharing indicator, and the BS and the terminal may determine the downlink transmission time resource region on the basis of the separately configured CORESET or search space set index. In another example, the terminal may transmit only the CORESET or search space set index and indicate downlink resource configuration and downlink resource sharing.

When there is no control region information configured by the BS in the slot to be configured as downlink transmission resources of the BS by the terminal, the terminal may temporarily use the separate control channel region configuration information. The terminal may indicate downlink sharing to the BS through at least one combination of the sharing indicator or the CORESET set or search space index. At this time, there is no downlink in the slot indicated by the terminal, and the BS may temporarily transmit a downlink control channel for the corresponding slot on the basis of control channel configuration information of the CORESET index or the search space set index indicated by the terminal. When there is one piece of separate control channel region configuration information, the terminal may configure downlink reception based on the separate control channel region configuration information in the BS through the sharing indicator.

Embodiment 7

In Embodiment 7, the BS and the terminal operating in the unlicensed band propose a method of determining a PDCCH/PDSCH resource region of the BS. Particularly, a method of configuring a downlink time resource region when downlink transmission of the BS is scheduled within a maximum channel occupancy interval acquired by the terminal is proposed.

Figure 15A:
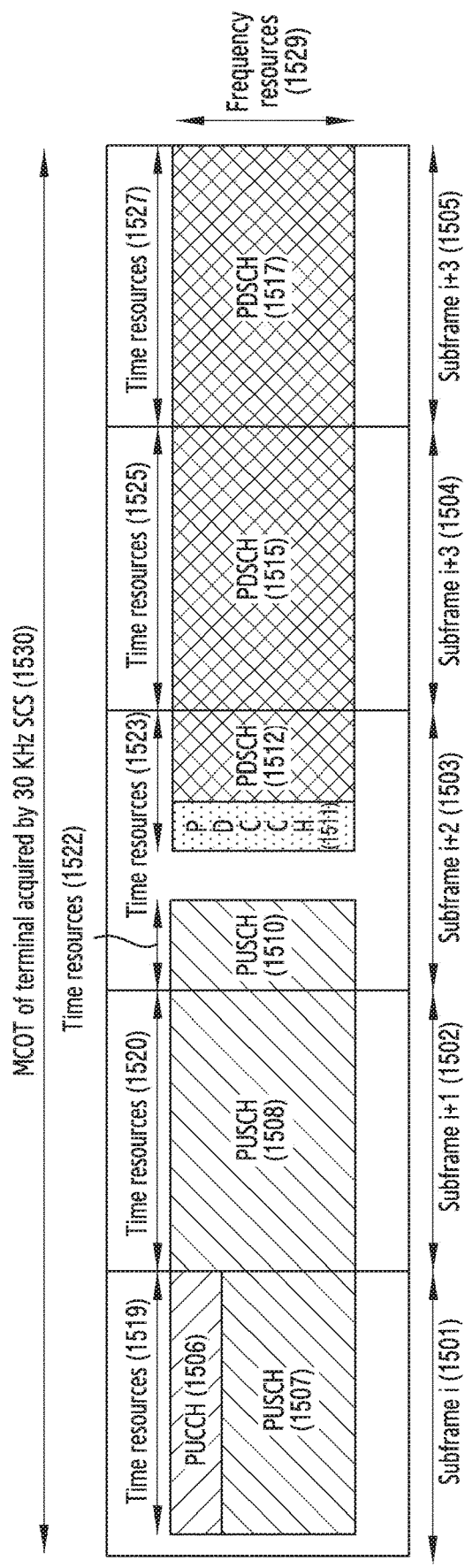
FIG. 15A illustrates a method of allocating resources in a wireless communication system according to an embodiment of the disclosure.

FIG. 15A illustrates a method of allocating resources in a wireless communication system according to an embodiment of the disclosure.

Figure 15B:
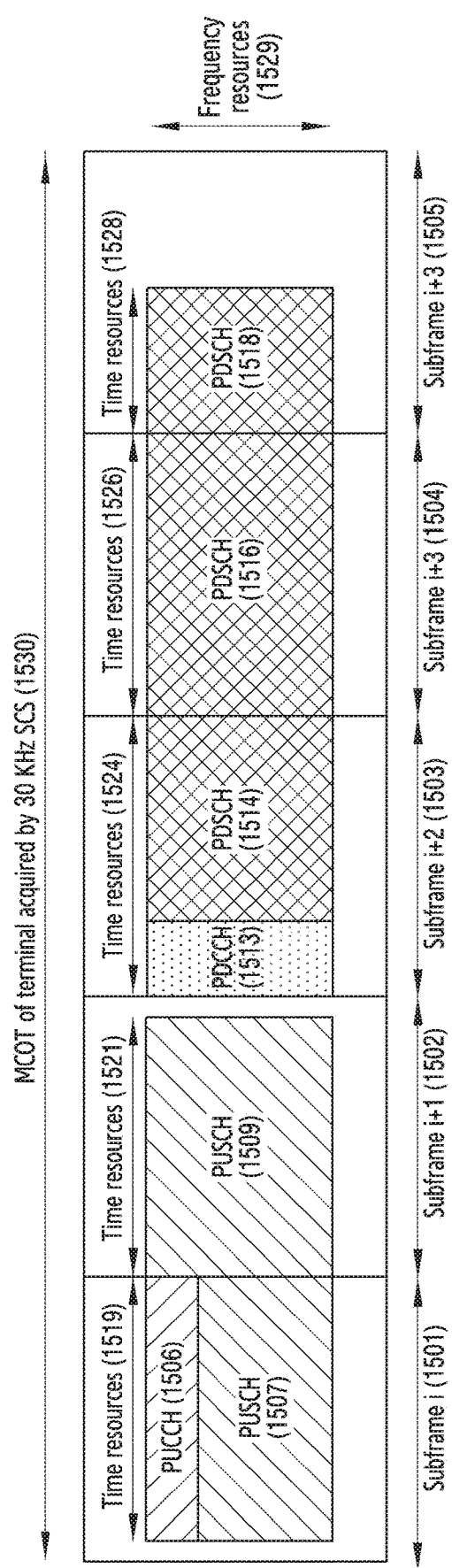
FIG. 15B illustrates a method of allocating resources in a wireless communication system according to an embodiment of the disclosure.

FIG. 15B illustrates a method of allocating resources in a wireless communication system according to an embodiment of the disclosure.

The operation of Embodiment 7 will be described with reference to FIGS. 15A and 15B.

Referring to FIGS. 15A and 15B, the BS and the terminal transmitting and receiving a signal in the unlicensed band assume a terminal configured to transmit the PUSCH in a plurality of slots through a grant-free configuration. The terminal may share a portion of the maximum channel occupancy time acquired after the channel access procedure (e.g., type 1 channel access procedure) with the BS so that the BS may use the channel access procedure for downlink signal transmission. The terminal may transmit time information which the BS can use for downlink signal transmission (e.g., information on a time at which the BS initiates a downlink signal and a time at which the BS can transmit a downlink signal, such as time resources 1519, 1520, 1522, 1523, 1525, and 1527) to the BS using uplink control information, such as PUSCH 1507, 1508, and 1510 or PUCCH 1506. The terminal indicates downlink time resource configuration information to the BS through an uplink control information signal (UCI), and the BS determines the downlink time resource configuration information according to the UCI. the time resource configuration information includes slot indication information that may indicate a start symbol or a last symbol 1528 within one slot or subframe or a slot location and transmission time indicator information that may indicate all downlink subframes 1503, 1504, and 1505 or slot lengths 1503, 1504, and 1505. The method is described below in more detail.

Method 5: Method of Indicating All Downlink Transmission Subframes and a Start or a Last Slot Method 5 is described below with reference to FIGS. 15A and 15B.

Referring to FIG. 15A, the terminal informs the BS of all subframes i+2, i+3, and i+4 1503, 1504, and 1505 through which downlink transmission is possible in units of ms or informs the BS of the number of slots corresponding to the ms unit through a downlink transmission time indicator of UCI. The slot indicator may have bit information as shown in Table 13, and a maximum occupancy interval of the unlicensed band is limited within 10 ms, and thus a number or a time available for the downlink transmission subframe is limited to 10 ms or smaller. For example, when a 3-bit downlink transmission time indicator is used and downlink transmission is performed at intervals of subcarrier of 15 kHz, the downlink transmission time indicator may indicate 1 to 8 ms or 1 to 8 slots. When the subcarrier spacing increases twice, the number of slots also increases twice.

TABLE 13

| | Transmission time indication |
|---|---|
| 000 | 1 ms or 1 × $2^u$ |
| 001 | 2 ms or 2 × $2^u$ |
| 010 | 3 ms or 3 × $2^u$ |
| 011 | 4 ms or 4 × $2^u$ |
| 100 | 5 ms or 5 × $2^u$ |
| 101 | 6 ms or 6 × $2^u$ |
| 110 | 7 ms or 7 × $2^u$ |
| 111 | 8 ms or 8 × $2^u$ |

The terminal may indicate the location of the start or last symbol through the slot indicator of UCI, and the slot indicator may have information as shown in Table 14. More specifically, as illustrated in FIG. 15A, when the last subframe 1505 is for downlink transmission, an offset value is 1 in Table 14. When downlink transmission starts in a first slot 1523 from the end in the first downlink subframe 1503, the location 1523 may be indicated by the slot indicator of UCI.

Referring to FIG. 15B, when downlink transmission starts at the first slot 1503 in the subframe configured for downlink, that is, when the offset value in Table 14 indicates 0, the slot indicator may mean that downlink transmission ends in a first slot 1528 at the end of the last subframe 1505. Method 5 may configure the start or last time point in units of slots (e.g., slots 1524, 1526) and configure downlink time resources in the more accurate unit than ms.

TABLE 14

| Slot indication | | | |
|---|---|---|---|
| 15 kHz | 30 kHz | 60 kHz | Offset |
| 0: full | 00: full | 00: full | 0: Subframe boundary starting |
| 1: 7 symbol | 01: last 1 slot | 01: last 1 slot | 1: Subframe boundary ending |
| | 10: reserved | 10: last 2 slot | |
| | 11: reserved | 11: last 3 slot | |

Embodiment 8

In Embodiment 8, the BS and the terminal operating in the unlicensed band propose a method of determining a PDCCH/PDSCH resource region of the BS (e.g., PDCCH 1511, 1513 or PDSCH 1512, 1515, 1517, 1514, 1516, 1518). Particularly, a method of configuring a downlink time resource region when downlink transmission of the BS is scheduled within a maximum channel occupancy interval acquired by the terminal is proposed.

Figure 16A:
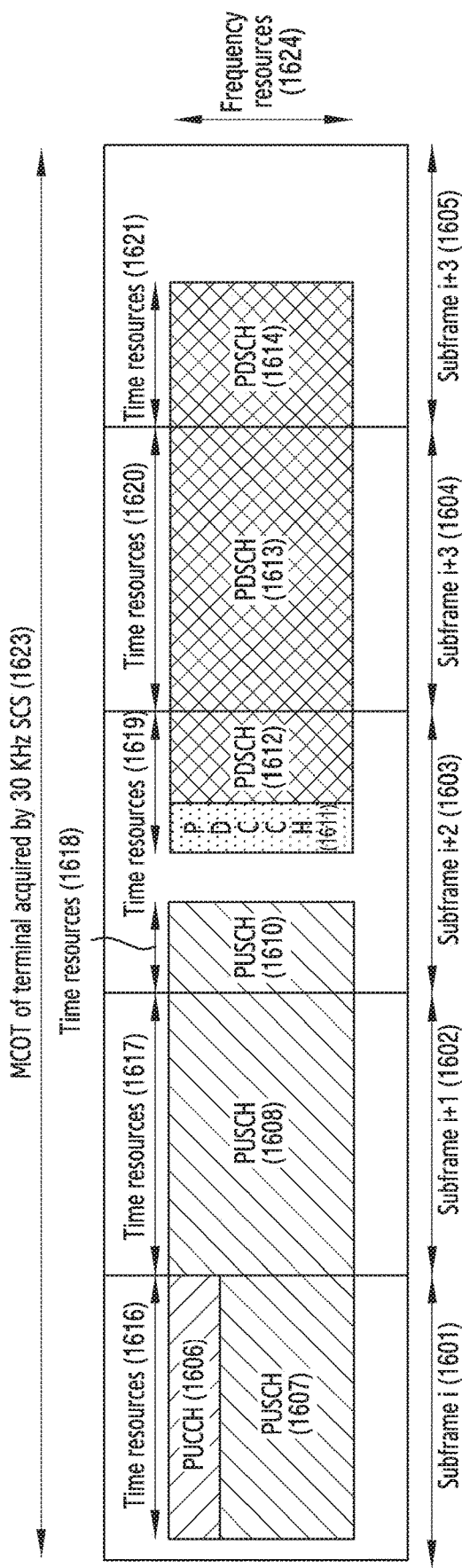
FIG. 16A illustrates a method of allocating resources in a wireless communication system according to an embodiment of the disclosure.

FIG. 16A illustrates a method of allocating resources in a wireless communication system according to an embodiment of the disclosure.

Figure 16B:
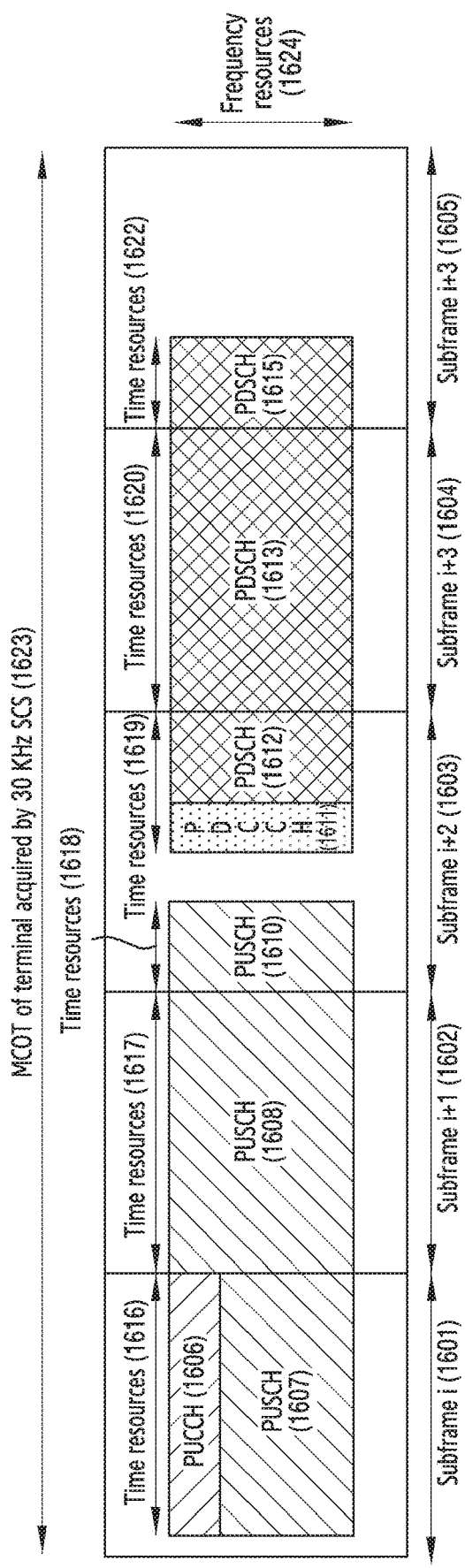
FIG. 16B illustrates a method of allocating resources in a wireless communication system according to an embodiment of the disclosure.

FIG. 16B illustrates a method of allocating resources in a wireless communication system according to an embodiment of the disclosure.

The operation of Embodiment 8 will be described with reference to FIGS. 16A and 16B.

Referring to FIGS. 16A and 16B, the BS and the terminal transmitting and receiving a signal in the unlicensed band assume a terminal configured to transmit the PUCCH/PUSCH (e.g., PUCCH 1606, PUSCH 1607, 1608, 1610) in a plurality of slots (e.g., subframe i 1601 using time resources 1616, subframe i+1 1602 using time resources 1617, and subframe i+3 using time resources 1618) through a grant-free configuration. The terminal may share a portion of the maximum channel occupancy time acquired after the channel access procedure (e.g., type 1 channel access procedure) with the BS so that the BS may use the same for downlink signal transmission. The terminal may transmit time information which the BS can use for downlink signal transmission (e.g., information on a time at which the BS initiates a downlink signal and a time at which the BS can transmit a downlink signal) to the BS using uplink control information. The terminal indicates downlink time resource configuration information to the BS through an uplink control information signal (UCI), and the BS determines the downlink time resource configuration information according to the UCI. The time resource configuration information includes slot indication information that may indicate a start symbol 1619 or last symbols 1621 and 1622 within one slot or subframe or a slot location and transmission time indicator information that may indicate time resource regions 1619, 1620, and 1621 in which downlink transmission is actually performed.

Another method by which the BS receiving downlink time or slot indicator information performs determination according to the received information will be described below.

Method 6: Method of Configuring a Start Slot and a Transmission Time

Method 6 is described below with reference to FIGS. 16A and 16B.

Referring to FIG. 16A, the terminal informs the BS of time resources 1619, 1620, and 1621 through which downlink transmission is possible in units of ms or informs the BS of the number of slots corresponding to the ms unit through a downlink transmission time indicator of UCI. The slot indicator may have information as shown in Table 14 of Embodiment 7 and a maximum occupancy interval of the unlicensed band is limited within 10 ms, a number or a time available for the downlink transmission slot is limited to 10 ms or smaller. For example, when a 3-bit downlink transmission time indicator is used and downlink transmission is performed at intervals of subcarrier of 15 kHz, the downlink transmission time indicator may indicate 1 to 8 ms or 1 to 8 slots. When the subcarrier spacing increases twice, the number of slots also increases twice. More specifically, as illustrated in FIG. 16A, when an offset value in Table 15 is 0, time resources 1619, 1620, and 1621 in which downlink transmission is possible are 3 ms or 3×21 slots.

Referring to FIG. 16B, when an offset value in Table 15 is 1, time resources 1619, 1620, and 1622 in which downlink transmission is possible are 2.5 ms or 3×21−1 slots. Through the offset indicator, a more detailed transmission time may be configured and the transmission time may increase.

The terminal may indicate a start point of downlink transmission through the slot indicator of UCI, and the slot indicator may have information as shown in Table 15. For example, as illustrated in FIG. 16A, a first slot 1619 or symbol 1619 of downlink transmission may be indicated in a subframe 1603 at which downlink starts, and a last time point 1621 of downlink transmission is configured after transmission time 1619, 1620, and 1621 indicated by the downlink transmission time indicator from a start time point. Method 6 has an advantage in that a start point and a time of downlink transmission is configured and thus transmission can be performed regardless of a boundary of the slot.

TABLE 15

| Slot indication | | | |
|---|---|---|---|
| 15 kHz | 30 kHz | 60 kHz | Offset |
| 0: full | 00: full | 00: full | 0: No offset |
| 1: 7 symbol | 01: last 1 slot | 01: last 1 slot | 1: 0.5 ms |
| | 10: reserved | 10: last 2 slot | |
| | 11: reserved | 11: last 3 slot | |

Embodiment 9

In Embodiment 9, the BS and the terminal operating in the unlicensed band propose a method of configuring a PDCCH/PDSCH (e.g., PDCCH 1611 and PDSCH 1612, 1613, 1614, 1615) resource region of the BS. A method of configuring downlink transmission of the BS within a maximum channel occupancy interval acquired by the terminal is proposed in consideration of the gap interval indicator, the slot indicator, and the transmission time indicator defined in embodiments.

The BS and the terminal transmitting and receiving a signal in the unlicensed band assume a terminal configured to transmit the PUSCH in a plurality of slots through a grant-free configuration. The terminal may share a portion of the maximum channel occupancy time acquired after the channel access procedure (e.g., type 1 channel access procedure) with the BS so that the BS may use the same for downlink signal transmission. The terminal may transmit time information which the BS can use for downlink signal transmission (e.g., information on a time at which the BS initiates a downlink signal and a time at which the BS can transmit a downlink signal) to the BS using uplink control information. The terminal configures sharing of the acquired maximum channel occupancy interval through an uplink control information signal (UCI), and the BS determines downlink time resource configuration information through the UCI. Further, the terminal configures a gap interval for performing the channel access procedure of the BS. The method is described below in more detail.

Method 7: Method of Configuring a Gap Interval and a Downlink Time Resource Region on the Basis of a Table.

Method 7 is described below with reference to Table 16. Content and values in Table 16 can be formed by various combinations of the methods described with reference to Embodiment 9. The terminal simultaneously configures downlink transmission in the BS, including the gap interval indicator, the slot indicator, and the transmission time indicator on the basis of information in Table 16. The BS configures a time resource region for downlink transmission on the basis of the configured value and configures a gap interval on the basis of the indicated channel access procedure. Method 7 has an advantage in that downlink resources can be configured using smaller bit information.

TABLE 16

| Bit Information | LBT Type | Slot Indication | Time Indication |
|---|---|---|---|
| 0000 | 16 us | Full | $1 \times 2^u$ |
| 0001 | 16 us | Half | $1 \times 2^u$ |
| 0010 | 16 us | Full | $2 \times 2^u$ |
| 0011 | 16 us | Half | $2 \times 2^u$ |
| 0100 | 16 us | Full | $3 \times 2^u$ |
| 0101 | 25 us | Full | $1 \times 2^u$ |
| 0110 | 25 us | Half | $1 \times 2^u$ |
| 0111 | 25 us | Full | $2 \times 2^u$ |
| 1000 | 25 us | Half | $2 \times 2^u$ |
| 1001 | 25 us | Full | $3 \times 2^u$ |

TABLE 16-continued

| Bit Information | LBT Type | Slot Indication | Time Indication |
|---|---|---|---|
| 1010 | Type1 | Full | $1 \times 2^u$ |
| 1011 | Type1 | Half | $1 \times 2^u$ |
| 1100 | Type1 | Full | $2 \times 2^u$ |
| 1101 | Type1 | Half | $2 \times 2^u$ |
| 1110 | Type1 | Full | $3 \times 2^u$ |
| 1111 | Reserved | Reserved | Reserved |

Embodiment 10

In Embodiment 10, the BS and the terminal operating in the unlicensed band propose a method of configuring a PDCCH/PDSCH resource region of the BS. A method of configuring downlink transmission of the BS within a maximum channel occupancy interval acquired by the terminal is proposed in consideration of the gap interval indicator and the transmission time indicator defined in embodiments.

The BS and the terminal transmitting and receiving a signal in the unlicensed band assume a terminal configured to transmit the PUSCH in a plurality of slots through a grant-free configuration. The terminal may allocate a portion of the acquired maximum channel occupancy time as a resource region for downlink transmission of the BS on the basis of uplink control information. The terminal configures sharing of the acquired maximum channel occupancy interval through an uplink control information signal (UCI), and the BS receiving the configuration determines downlink time resource configuration information through the UCI. Further, the terminal configures a gap interval for performing the channel access procedure of the BS. The method is described below in more detail.

Method 8: Method of Configuring Sharing of the Maximum Channel Occupancy Interval of the Terminal Using the Gap Interval Indicator Method 8 is a method by which the BS configures downlink transmission when the terminal configures a reserved gap interval indicator or configures no gap interval.

Figure 17:
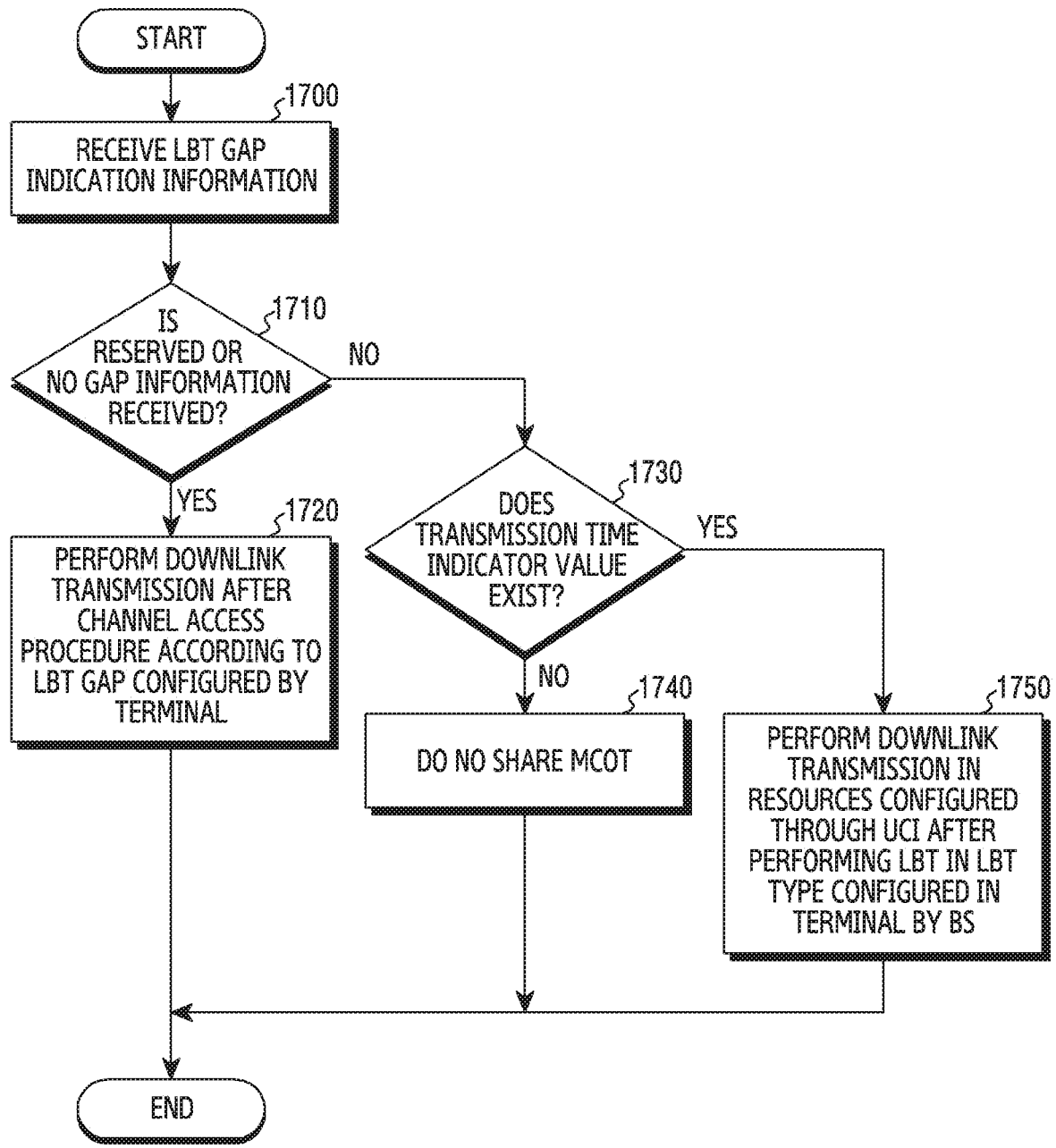
FIG. 17 is a flowchart illustrating the operation of the BS in a wireless communication system according to an embodiment of the disclosure.

FIG. 17 is a flowchart illustrating the operation of the BS in a wireless communication system according to an embodiment of the disclosure.

Referring to FIG. 17, a BS operation in the embodiment of method 8 is described below.

Embodiment 11

In Embodiment 11, the BS and the terminal operating in the unlicensed band propose a method by which the BS determines a downlink transmission time resource region. Particularly, a method of configuring and determining downlink transmission time resources of the BS by indicating uplink transmission time resources when scheduling downlink transmission of the BS within a maximum channel occupancy interval acquired by the terminal is proposed.

Specifically, it is assumed that the BS may determine the maximum channel occupancy time acquired by the terminal on the basis of a separate indicator included in uplink control information transmitted by the terminal or type information of the channel access procedure performed by the terminal. The terminal may indicate an uplink transmission time resource region to the BS through at least one combination in the aforementioned embodiment. For example, the terminal may transmit information on an uplink start slot (or time), a start symbol (or time), or an uplink transmission length (or end time or an end symbol) to the BS through uplink control information. The BS may determine that a portion except for an uplink transmission time resource region transmitted by the terminal while being included in the uplink control information in the maximum channel occupancy time is the downlink transmission time resource region of the BS.

The terminal may indicate a downlink transmission time resource region configuration method through the downlink sharing indicator included in the uplink control information or a separate indicator to the BS. For example, when the downlink sharing indicator is not included in the uplink control information or the downlink sharing indicator indicates non-sharing, the terminal transmits uplink control information including uplink transmission time resource region information. When the downlink sharing indicator in the uplink control information indicates downlink sharing, the terminal transmits uplink control information including downlink transmission time resource region information.

Also, in Embodiment 11, when the terminal transmits only downlink transmission time resource region information without inserting the sharing indicator into the uplink control channel, the BS may determine that downlink sharing is configured.

The BS receives gap interval-related configuration information from the terminal in operation 1700. When the gap interval information does not indicate reserved or no gap in operation 1710, the BS performs the channel access procedure for downlink transmission according to the gap interval configured by the terminal in step 1720. When the gap interval information indicates reserved or no gap in operation 1710, it is determined whether a transmission time indicator value exists in operation 1730. When the transmission time indicator value is present in operation 1730, the BS performs the channel access procedure on the basis of channel access procedure information which the BS configures in the terminal and performs downlink transmission using downlink transmission resources configured through UCI in operation 1750. When there is no transmission time indicator value or the transmission time indicator value indicates reserved in operation 1730, the BS determines that the maximum channel occupancy interval acquired by the terminal is not shared in operation 1740. When there is no transmission time indicator value, it is assumed that the size of bits of the transmission time indicator is variable. Method 8 has an advantage in that sharing of the maximum channel occupancy interval acquired by the terminal can be configured using the gap interval indicator and the transmission time indicator without separately configuring a sharing indicator information bit.

Another method by which the BS receiving the gap interval indicator and the transmission time indicator information performs determination according to the received information is described below.

Method 9: Method of Configuring Sharing of the Maximum Channel Occupancy Interval of the Terminal According to Whether There is the Gap Interval Indicator In method 9, the terminal may not insert the gap interval indicator into uplink control information (UCI). When the gap interval indicator is not inserted, the size of the uplink control information is variable, and downlink resource configuration-related indicator, such as the slot indicator or the transmission time indicator, is not transmitted. When the gap interval indicator is not inserted, the BS determines that the terminal does not configure sharing of the maximum channel occupancy interval.

Figure 18:
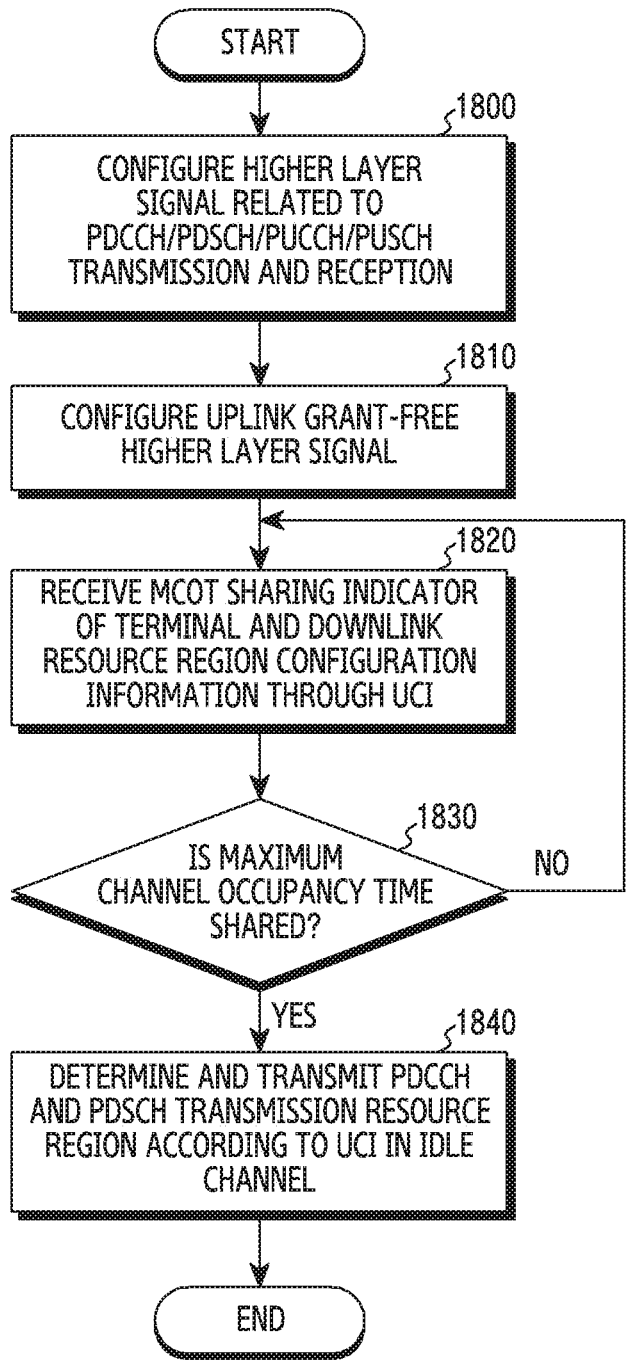
FIG. 18 is a flowchart illustrating the operation of the BS in a wireless communication system according to an embodiment of the disclosure.

FIG. 18 is a flowchart illustrating the operation of the BS in a wireless communication system according to an embodiment of the disclosure.

Referring to FIG. 18, a BS operation according to an embodiment of the disclosure is illustrated.

The BS may transmit configuration of PDCCH, PDSCH, and PUSCH transmission and reception to the terminal through a higher layer signal in operation 1800. For example, the BS may transmit a PDCCH resource region in which downlink or uplink scheduling information is received, the CORESET configuration, and the search space configuration to the terminal through a higher layer signal. Further, the BS may transmit, to the terminal, the configuration of PDSCH/PUSCH transmission and reception including offset information between a PDCCH reception slot and a PDSCH reception slot or a PUSCH transmission slot and the number of times the PDSCH or the PUSCH is repeatedly transmitted, through a higher layer signal. In operation 1810, the BS may additionally transmit grant-free-related configuration information such as a grant-free transmission period and offset information. The grant-free-related configuration information transmitted to the terminal in operation 1810 may be transmitted in operation 1800. The BS receives a maximum channel occupancy interval sharing indicator from the terminal in operation 1820. In the case of non-sharing in operation 1830, the BS may wait for the next sharing indicator. When the determined state is sharing in operation 1830 and the unlicensed band is an idle channel, the BS may transmit the PDCCH or the PDSCH using downlink resource region configuration information, received through UCI in operation 1820, in operation 1840.

Figure 19:
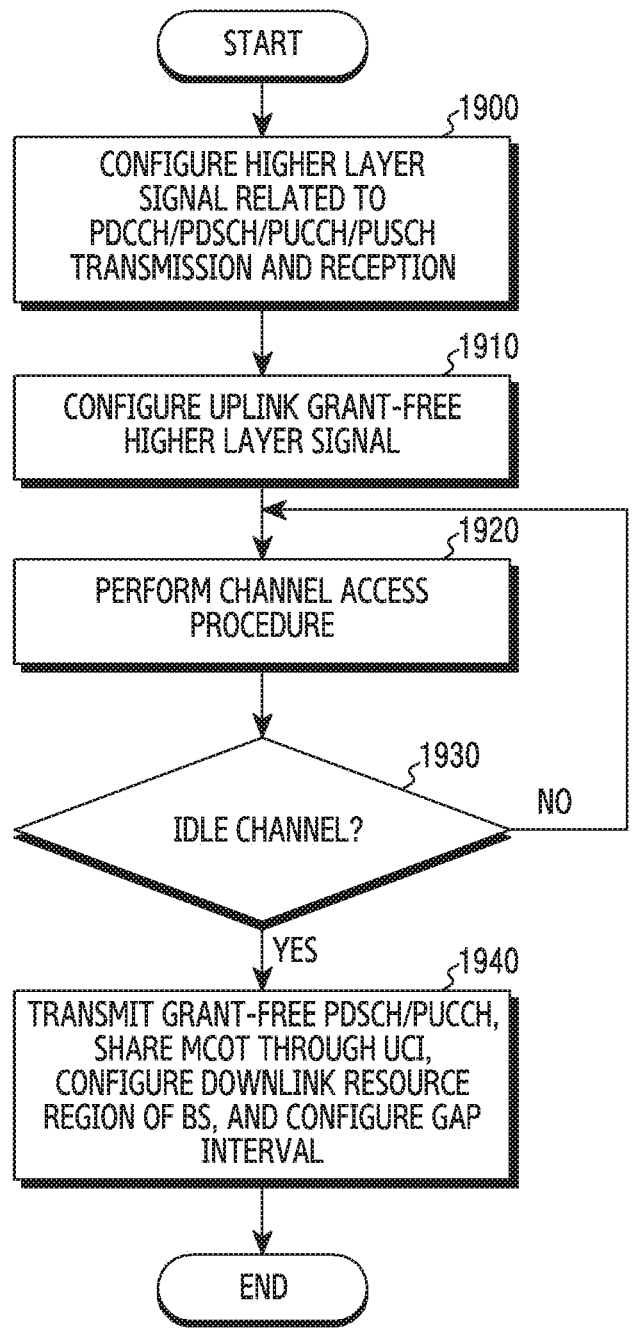
FIG. 19 is a flowchart illustrating the operation of the UE in a wireless communication system according to an embodiment of the disclosure.

FIG. 19 is a flowchart illustrating the operation of the UE in a wireless communication system according to an embodiment of the disclosure.

Referring to FIG. 19, the terminal operation according to an embodiment of the disclosure is described below.

The terminal receives configuration of PDCCH, PDSCH, and PUSCH transmission and reception from the BS through a higher layer signal and configures PDCCH, PDSCH, and PUSCH transmission and reception according to the received configuration information in operation 1900. For example, the terminal may receive a PDCCH resource region in which downlink or uplink scheduling information is received, the CORESET configuration, and the search space configuration from the BS through a higher layer signal. The terminal may receive, from the BS, the configuration of PDSCH/PUSCH transmission and reception including offset information between a PDCCH reception slot and a PDSCH reception slot or a PUSCH transmission slot and the number of times the PDSCH or the PUSCH is repeatedly transmitted, through a higher layer signal. In operation 1910, the terminal may additionally receive grant-free-related configuration information such as a grant-free transmission period and offset information. The grant-free-related configuration information in operation 1910 may be included in the higher layer signal configuration information transmitted in operation 1900. In the case of the terminal which desires to transmit a signal in the unlicensed band, the terminal may perform a channel access procedure for the unlicensed band and determine whether the unlicensed band is in an idle state in operation 1930. When the state of the unlicensed band determined in operation 1930 is not the idle state, the terminal may continue or reinitiate the channel access procedure for the unlicensed band in operation 1920. When the state of the unlicensed band determined in operation 1930 is in the idle state, the BS may perform grant-free PUSCH or PUCCH transmission in operation 1940. The maximum channel occupancy interval acquired by the terminal may be shared through the UCI. The terminal may configure downlink resources for the BS and a gap interval for the channel access procedure of the BS according to one of the various embodiments proposed by the embodiment or a combination thereof in operation 1940.

Figure 20:
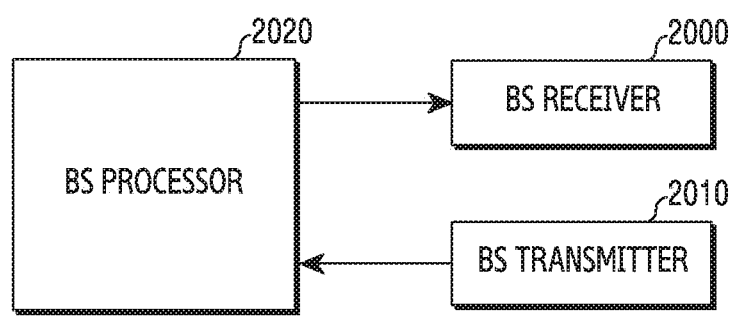
FIG. 20 illustrates the configuration of the BS in a wireless communication system according to an embodiment of the disclosure.

FIG. 20 illustrates the configuration of the BS in a wireless communication system according to an embodiment of the disclosure. Specifically, FIG. 20 is a block diagram illustrating the internal structure of the BS according to an embodiment of the disclosure.

Referring to FIG. 20, the BS according to the disclosure may include a BS receiver 2000, a BS transmitter 2010, and a BS processor 2020.

The BS receiver 2000 and the BS transmitter 2010 may be collectively called a transceiver in an embodiment of the disclosure. The transceiver may transmit and receive a signal to/from the terminal. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a radio channel, output the received signal to the BS processor 2020, and transmit the signal output from the BS processor 2020 through the radio channel.

The BS processor 2020 may control a series of processes so that the BS may operate according to the aforementioned various embodiments of the disclosure. For example, the BS receiver 2000 may receive a data signal including a control signal transmitted by the terminal, and the BS processor 2020 may determine the reception result of a control signal and a data signal transmitted by the terminal. In another example, the BS processor 2020 may perform the channel access procedure for the unlicensed band. The BS receiver 2000 may receive signals transmitted in the unlicensed band, and the BS processor 2020 may compare an intensity of the received signal with a threshold value which is predefined or is determined by a value of a function having a bandwidth as a factor, and determine whether the unlicensed band is in the idle state. In another example, when the BS receiver 2000 receives information on a downlink transmission interval within a channel occupancy interval of the unlicensed band from the terminal, the BS processor 2020 may control downlink of the BS and reconfigure or change a data channel transmission time or period, and accordingly, the BS transmitter 2010 may control downlink and transmit the data channel.

The BS processor 2020 may maintain or change a contention interval value for the channel access procedure according to the reception result of the data signal of the terminal received by the BS receiver 2000. When it is determined that the unlicensed band is in the idle state, a downlink signal including slot format indicator information may be transmitted through the BS transmitter 2010. The BS transmitter 2010 may also transmit information on an uplink or downlink transmission interval within the channel occupancy interval of the unlicensed band determined by the BS processor 2020 to the terminal. Further, the BS may receive a PUSCH transmitted by the terminal through the BS receiver 2000 in a PUSCH transmission resource region determined according to slot format indicator information and PDSCH/PUSCH scheduling information.

Figure 21:
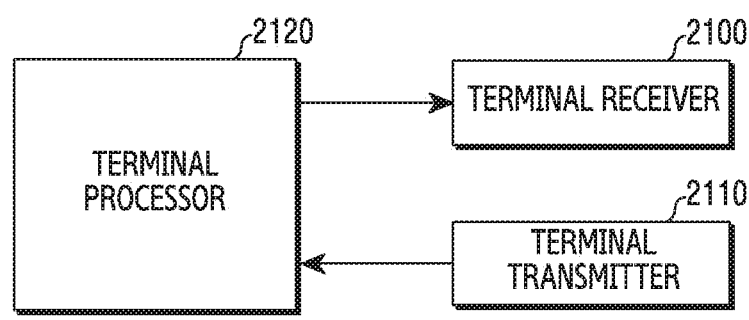
FIG. 21 illustrates the configuration of the terminal in a wireless communication system according to an embodiment of the disclosure.

FIG. 21 illustrates the configuration of the terminal in a wireless communication system according to an embodiment of the disclosure. Specifically, FIG. 21 is a block diagram illustrating the internal structure of the terminal according to an embodiment of the disclosure.

Referring to FIG. 21, the terminal according to the disclosure may include a terminal receiver 2100, a terminal transmitter 2110, and a terminal processor 2120.

The terminal receiver 2100 and the terminal transmitter 2110 may be collectively called a transceiver according to various embodiments of the disclosure. The transceiver may transmit and receive a signal to and from the BS. The signal may include control information and data. To this end, the transceiver includes an RF transmitter that up-converts and amplifies a frequency of a transmitted signal, an RF receiver that low-noise amplifies a received signal and down-converts the frequency, and the like. The transceiver may receive a signal through a radio channel, output the received signal to the terminal processor 2120, and transmit the signal output from the terminal processor 2120 through the radio channel.

The terminal processor 2120 may control a series of processes so that the terminal may operate according to the aforementioned various embodiments of the disclosure. For example, the terminal receiver 2100 may receive a data signal including a control signal, and the terminal processor 2120 may determine the reception result of the data signal. Thereafter, when the first signal reception result and data reception should be transmitted to the BS at timing, the terminal transmitter 2110 transmits the first signal reception result to the BS at the timing determined by processor. In another example, when the terminal receiver 2100 receives information on the uplink or downlink transmission interval within the channel occupancy interval of the unlicensed band from the BS, the terminal processor 2120 may reconfigure or change a downlink control channel transmission time or period of the terminal or reconfigure or change time region allocation information of an uplink data channel scheduled in the terminal, and accordingly the terminal receiver 2100 may receive a downlink control channel transmitted by the BS. The terminal may receive the reception result of uplink data transmitted by the terminal transmitter 2100 from the BS, and the terminal processor 2120 may maintain or change the size of the contention interval used for the channel access procedure for transmitting an unlicensed band signal according to the received result. Further, the terminal may receive slot format indicator information transmitted by the BS, and the terminal processor 2120 may reconfigure or change time region allocation information of the uplink data channel scheduled according to the received slot format indicator information.

Meanwhile, the various embodiments disclosed in the specification and drawings are merely presented to easily describe technical contents of the disclosure and help the understanding of the disclosure and are not intended to limit the scope of the disclosure. It would be apparent to those skilled in the art to which the disclosure belongs that different modifications can be achieved based on the technical spirit of the disclosure. Further, if necessary, the above respective embodiments may be employed in combination. For example, parts of the methods proposed in the disclosure may be combined to operate a base station and a terminal Further, although the embodiments have been described on the basis of 5G and NR systems, it may be possible to implement other variant embodiments on the basis of the technical idea of the embodiments in other systems such as LTE, LTE-A, and LTE-A-Pro systems.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and equivalents.

What is claimed is:

1. A method of operating a terminal in a wireless communication system, the method comprising:
    acquiring a maximum channel occupancy time (MCOT) of the terminal within an unlicensed band;
    determining a time interval which a base station (BS) can use for downlink signal transmission in the MCOT;
    transmitting the MCOT and time information related to the time interval to the BS; and
    receiving a downlink signal from the BS during the time interval in the MCOT,
    wherein the time information includes information on a gap interval for channel access of the BS before a time point at which the BS initiates the downlink signal,
    wherein the time information includes a listen before talk (LBT) type indication for the gap interval, a slot indication including a downlink sharing indicator, and time indication indicating a number of slots for the downlink signal transmission,
    wherein the LBT type indication for the gap interval comprises bit information indicating a channel access procedure configured by the BS and a number of symbols emptied for the gap interval,
    wherein a first slot including the time point is a slot after a predetermined number of slots determined based on the downlink sharing indicator from a second slot in which the downlink sharing indicator is transmitted to the BS, and
    wherein the predetermined number of the slots is configured by the BS based on subcarrier spacing.

2. The method of claim 1, wherein the gap interval is configured according to the subcarrier spacing configured in the terminal.

3. The method of claim 1, wherein the gap interval is configured to have a particular time length regardless of the subcarrier spacing configured in the terminal.

4. The method of claim 1, wherein the time information further includes at least one of an index of a control resource set (CORESET) for the downlink signal transmission by the BS or an index of a search space set for the downlink signal transmission by the BS.

5. The method of claim 1, wherein the time information further includes information on at least one of an uplink start slot of the terminal, an uplink start symbol of the terminal, or an uplink transmission length of the terminal.

6. A method of operating a base station (BS) in a wireless communication system, the method comprising:
    receiving a maximum channel occupancy time (MCOT) of a terminal within an unlicensed band and time information related to a time interval which the BS can use for downlink signal transmission in the MCOT from the terminal; and
    transmitting a downlink signal to the terminal during the time interval in the MCOT,
    wherein the time information includes information on a gap interval for channel access of the BS before a time point at which the BS initiates the downlink signal,
    wherein the time information includes a listen before talk (LBT) type indication for the gap interval, and slot indication including a downlink sharing indicator, and time indication indicating a number of slots for the downlink signal transmission,
    wherein the LBT type indication for the gap interval comprises bit information indicating a channel access procedure configured by the BS and a number of symbols emptied for the gap interval,
    wherein a first slot including the time point is a slot after a predetermined number of slots determined based on the downlink sharing indicator from a second slot in which the downlink sharing indicator is transmitted to the BS, and
    wherein the predetermined number of the slots is configured by the BS based on subcarrier spacing.

7. The method of claim 6, wherein the gap interval is configured according to the subcarrier spacing configured in the terminal.

8. The method of claim 6, wherein the gap interval is configured to have a particular time length regardless of the subcarrier spacing configured in the terminal.

9. The method of claim 6, wherein the time information further includes at least one of an index of a control resource set (CORESET) for the downlink signal transmission by the BS or an index of a search space set for the downlink signal transmission by the BS.

10. The method of claim 6, wherein the time information further includes information on at least one of an uplink start slot of the terminal, an uplink start symbol of the terminal, or an uplink transmission length of the terminal.

11. The method of claim 6, wherein the transmitting of the downlink signal comprises transmitting the downlink signal according to a gap interval configured by the terminal when gap interval information received from the terminal indicates a reserved or no gap.

12. The method of claim 6, wherein the transmitting of the downlink signal comprises transmitting the downlink signal according to whether the MCOT is or is not shared.

13. The method of claim 12, further comprising:
determining whether the MCOT is or is not shared based on the time information.

14. An apparatus of a terminal in a wireless communication system, the apparatus comprising:
a transceiver; and
at least one processor electrically connected to the transceiver,
wherein the at least one processor is configured to:
acquire a maximum channel occupancy time (MCOT) of the terminal within an unlicensed band,
configure a time interval which a base station (BS) can use for downlink signal transmission in the MCOT,
transmit the MCOT and time information related to the time interval to the BS, and
receive a downlink signal from the BS during the time interval in the MCOT,
wherein the time information includes information on a gap interval for channel access of the BS before a time point at which the BS initiates the downlink signal,
wherein the time information includes a listen before talk (LBT) type indication for the gap interval, and slot indication including a downlink sharing indicator, and time indication indicating a number of slots for the downlink signal transmission,
wherein the LBT type indication for the gap interval comprises bit information indicating a channel access procedure configured by the BS and a number of symbols emptied for the gap interval,
wherein a first slot including the time point is a slot after a predetermined number of slots determined based on the downlink sharing indicator from a second slot in which the downlink sharing indicator is transmitted to the BS, and
wherein the predetermined number of the slots is configured by the BS based on subcarrier spacing.

* * * * *